(12) United States Patent
Engh-Halstvedt et al.

(10) Patent No.: US 11,189,005 B1
(45) Date of Patent: Nov. 30, 2021

(54) INDEX BUFFERS IN GRAPHICS PROCESSING SYSTEMS

(71) Applicant: Arm Limited, Cambridge (GB)

(72) Inventors: Andreas Due Engh-Halstvedt, Trondheim (NO); Jorn Nystad, Trondheim (NO); Olof Henrik Uhrenholt, Lomma (SE); Frank Klaeboe Langtind, Melhus (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/004,797

(22) Filed: Aug. 27, 2020

(51) Int. Cl.
*G06T 1/20* (2006.01)
*G06T 1/60* (2006.01)
*G06T 17/10* (2006.01)
*G06T 9/00* (2006.01)
*G06T 15/00* (2011.01)

(52) U.S. Cl.
CPC .................. *G06T 1/20* (2013.01); *G06T 1/60* (2013.01); *G06T 9/00* (2013.01); *G06T 15/005* (2013.01); *G06T 17/10* (2013.01)

(58) Field of Classification Search
CPC .... G06T 1/20; G06T 1/60; G06T 9/00; G06T 15/005; G06T 17/10
USPC ......................................................... 345/555
See application file for complete search history.

(56) References Cited

U.S. PATENT DOCUMENTS

| 10,149,958 | B1* | 12/2018 | Tran ....................... G16H 20/30 |
| 2012/0281005 | A1 | 11/2012 | Nystad | |
| 2014/0362908 | A1* | 12/2014 | Lundberg ............. H04N 19/137 375/240.12 |
| 2017/0193691 | A1 | 7/2017 | Langtind | |
| 2017/0262954 | A1 | 9/2017 | Arntzen | |
| 2018/0232912 | A1* | 8/2018 | Nevraev ................. G06T 9/001 |

* cited by examiner

*Primary Examiner* — Jacinta M Crawford
(74) *Attorney, Agent, or Firm* — Vierra Magen Marcus LLP

(57) ABSTRACT

A method of operating a graphics processor that is configured to execute a graphics processing pipeline is provided. The method comprises the graphics processor reading, from an index buffer in external memory, a block of data comprising plural sets of indices, each set of indices comprising a sequence of indices indexing a set of vertices that defines a primitive of a plurality of primitives to be processed by the graphics processing pipeline. The graphics processor compresses the block of data to form a compressed version of the block of data, and stores the compressed version of the block of data in an internal memory of the graphics processor.

18 Claims, 10 Drawing Sheets

INDEX BUFFERS IN GRAPHICS PROCESSING SYSTEMS

BACKGROUND

The technology described herein relates to the processing of computer graphics, and in particular to a method of operating a graphics processor.

Graphics processing is normally carried out by first splitting a scene (e.g. a 3D model) to be displayed into a number of similar basic components or "primitives", which primitives are then subjected to the desired graphics processing operations. The graphics primitives are usually in the form of simple polygons, such as triangles. Each primitive is normally defined by and represented as a set of vertices (e.g. 3 vertices in the case of a triangular primitive).

Typically the set of vertices to be used for a given graphics processing output (e.g. frame for display, draw call, etc.) will be stored as a set of vertex data defining the vertices (e.g. the relevant attributes for each of the vertices). A set of vertex data defining the vertices to be used for generating a given graphics processing output is typically referred to as a vertex buffer.

Each primitive may be defined in terms of a set of indices that reference the vertices in the set of vertex data that make up that primitive. Thus, the set of primitives to be processed for a given graphics processing output will be defined by a set of indices that indicate the corresponding vertices in a set of vertex data (in a vertex buffer) that are to be used for the primitives in question. The set of indices that refer to the vertices and define the primitives to be processed is typically referred to as an index buffer.

Before primitives and their vertices can be processed by a fragment processing pipeline of the graphics processing pipeline, the attributes of the vertices originally defined for a given graphics processing output (e.g. draw call) are usually subjected to initial so-called "vertex shading" operations (by a vertex processing pipeline of the graphics processing pipeline) that operate to transform the attributes for each originally defined vertex into a desired form for the subsequent graphics processing operations (by the fragment processing pipeline).

Once primitives and their vertices have been generated and defined, they can be further processed by the fragment processing pipeline, in order to generate the desired graphics processing output (render output), such as a frame for display.

The Applicant believes that there remains scope for improvements to graphics processors and to graphics processing.

BRIEF DESCRIPTION OF THE DRAWINGS

Various embodiments of the technology described herein will now be described by way of example only and with reference to the accompanying drawings, in which.

Like reference numerals are used for like elements throughout the figures, where appropriate.

DETAILED DESCRIPTION

Figure 1:
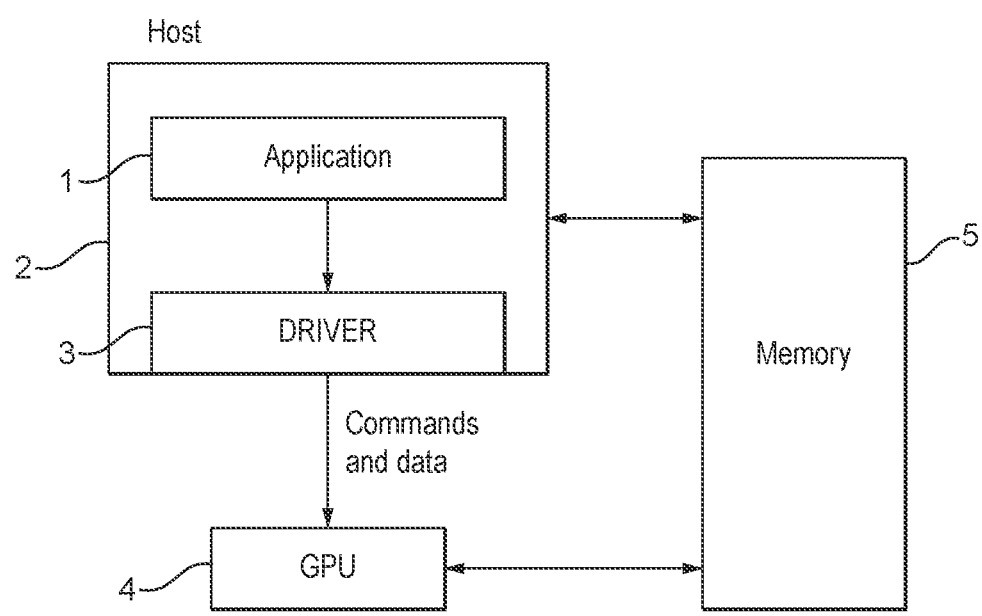
FIG. 1 shows schematically a graphics processing system in accordance with various embodiments.

A first embodiment of the technology described herein comprises a method of operating a graphics processor that is configured to execute a graphics processing pipeline, the method comprising:

the graphics processor reading, from an index buffer in external memory, index buffer data comprising plural sets of indices, each set of indices comprising a sequence of indices indexing a set of vertices that defines a primitive of a plurality of primitives to be processed by the graphics processing pipeline;

the graphics processor compressing the index buffer data to form a compressed version of the index buffer data; and the graphics processor storing the compressed version of the index buffer data in an internal memory of the graphics processor.

A second embodiment of the technology described herein comprises a graphics processor configured to execute a graphics processing pipeline, the graphics processor comprising:

a read circuit configured to read, from an index buffer in external memory, index buffer data comprising plural sets of indices, each set of indices comprising a sequence of indices indexing a set of vertices that defines a primitive of a plurality of primitives to be rendered by the graphics processing pipeline;

an internal memory; and a compressor circuit configured to compress the index buffer data to form a compressed version of the index buffer data, and to store the compressed version of the index buffer data in the internal memory.

A third embodiment of the technology described herein comprises a method of operating a graphics processor that is configured to execute a graphics processing pipeline, the method comprising:

the graphics processor reading, from an index buffer in external memory, a block of index buffer data comprising plural sets of indices, each set of indices comprising a sequence of indices indexing a set of vertices that defines a primitive of a plurality of primitives to be processed by the graphics processing pipeline;

the graphics processor compressing the block of index buffer data to form a compressed version of the block of index buffer data; and the graphics processor storing the compressed version of the block of index buffer data in an internal memory of the graphics processor.

A fourth embodiment of the technology described herein comprises a graphics processor configured to execute a graphics processing pipeline, the graphics processor comprising:

a read circuit configured to read, from an index buffer in external memory, a block of index buffer data comprising plural sets of indices, each set of indices comprising a sequence of indices indexing a set of vertices that defines a primitive of a plurality of primitives to be rendered by the graphics processing pipeline;

an internal memory; and a compressor circuit configured to compress the block of index buffer data to form a compressed version of the block of index buffer data, and to store the compressed version of the block of index buffer data in the internal memory.

Various embodiments are directed to a method of operating a graphics processor in which the graphics processor reads blocks of index buffer data from an index buffer in external memory, and stores the read index buffer data in an internal memory, e.g. for later use in its graphics processing operations. Each block of data comprises a block of index buffer data, and so comprises plural sets of indices, where each set of indices comprises a sequence of indices indexing a set of vertices that defines a primitive of a plurality of primitives to be rendered by the graphics processing pipeline.

The Applicant has recognised that it is often necessary for a graphics processor to read a large amount of such index buffer data, for example during vertex shading operations and/or primitive assembly operations. The Applicant has also recognised that it can often be the case that blocks of index buffer data (otherwise known as "cache lines") received by the graphics processor from the external memory (via a memory bus) are wider than the width of the graphics processor's internal memory (i.e. comprise more data than the maximum amount of data that the graphics processor's internal memory is capable of storing in a single clock cycle).

This width mismatch can mean that the graphics processor requires multiple clock cycles to store a single block ("cache line") of index buffer data in its internal memory. This then means that the memory bus (that connects the graphics processor to the external memory) can be occupied for multiple clock cycles by the graphics processor reading a single block (cache line) of index buffer data. This can in turn reduce the memory bus bandwidth that is available for use by other graphics processor operations and/or by other parts of the overall graphics processing system, and can accordingly slow the graphics processing system.

While it would be possible to provide the graphics processor with an internal memory that has sufficient width to store an entire block (cache line) of index buffer data in each clock cycle, such an internal memory would require a relatively large amount of semiconductor area in the graphics processor, and so would increase the overall cost and power requirements of the graphics processor. It is often desirable to reduce the cost and power requirements of graphics processors, especially e.g. in portable devices, where power may be limited.

In this regard, the Applicant has furthermore recognised that the index buffer data is typically stored in the index buffer (in external memory) in an uncompressed form (and/or is provided to the graphics processor via the memory bus in that form), but that the index buffer data can be highly compressible.

While it would be possible to configure the graphics processing system to store index buffer data in the index buffer (in external memory) in a compressed form (and/or to provide the index buffer data to the graphics processor via the memory bus in that form), this may require significant, potentially undesirable, changes to the overall graphics processing system, including for example to the application programming interface (API) of the graphics processing system.

In accordance with various embodiments, the graphics processor is configured to compress blocks of index buffer data, and to store compressed blocks of index buffer data in its internal memory. As will be described in more detail below, the graphics processor may be configured to compress blocks of index buffer data such that each compressed block of index buffer data can be stored in the graphics processor's internal memory in a single clock cycle, or in a reduced number of clock cycles compared to the number of clock cycles required for an uncompressed block of index buffer data.

This means that the graphics processor of various embodiments (on average) requires fewer clock cycles to store a block ("cache line") of index buffer data in its internal memory. This in turn beneficially reduces the number of clock cycles during which the memory bus is occupied, and so can free up the bus for other uses. This in effect increases the usable bandwidth on the bus.

Furthermore, configuring the graphics processor itself to compress blocks of index buffer data obviates any need for significant changes to other parts of the overall graphics processing system, and can allow particularly efficient compression schemes to be used (as will be described in more detail below).

The overall effect of this is that the graphics processor can read index buffer data at a relatively fast rate, and in a manner that is particularly efficient in terms of cost, memory bandwidth and power usage.

It will be appreciated, therefore, that various embodiments provide an improved graphics processor.

The graphics processor can be implemented as desired. The graphics processor may be part of an overall graphics processing system that includes a host processor that executes applications that can require graphics processing by (the graphics processing pipeline of) the graphics processor.

The host processor will send appropriate commands and data to the graphics processor to control it to perform graphics processing operations and to produce graphics processing output(s) required by an application executing on the host processor. To facilitate this, the host processor may execute a driver for the graphics processor and a compiler or compilers for compiling programs to be executed by the (programmable processing stage (shader) of the) graphics processor.

Commands and/or data may be sent from the host processor to the graphics processor by the host processor writing the commands and/or data to the external memory, and the graphics processor reading the commands and/or data from the external memory.

The external memory may be any suitable memory such as a main memory of the graphics processing system. The external memory is external to the graphics processor (is external to the graphics processing unit (GPU)) (and is external to the host processor), i.e. comprises a separate integrated circuit (chip). In embodiments, each of the host processor, the graphics processor and the memory is provided as a respective different integrated circuit (chip). The host processor, the graphics processor and the memory may communicate via an interconnect such as a memory bus.

The data provided by the host processor to the graphics processor may include, in particular, vertex buffer data and/or index buffer data. A set of vertex buffer data and/or a set of index buffer data may be provided by the host processor to the graphics processors in respect of a given (each) graphics processing output, e.g. draw call.

The vertex buffer data may comprise a set of vertex data defining the vertices to be used for generating a given graphics processing output. The vertex buffer data may represent a plurality of vertices that define one or more primitives to be processed (rendered) by the graphics processing pipeline. The vertex data may include attributes in respect of each vertex, such as a position for each vertex, its colour, and so on.

The vertex buffer data may be stored by the host processor in a vertex buffer in the external memory. Thus, in various embodiments, the method comprises the host processor storing a set of vertex buffer data in the vertex buffer in the external memory (and the graphics processor then reading blocks of the vertex buffer data from the vertex buffer in the external memory).

The index buffer data may comprise index data defining a set of indices that indicates the corresponding vertices in the set of vertex data (in the vertex buffer) that are to be used for the primitives for generating a given graphics processing output. Thus, the index buffer may comprise sets of indices that refer to the vertices and define the primitives to be processed. The index data may include plural sets of indices, where each set of indices comprises a sequence of indices indexing a set of vertices that defines a primitive of a plurality of primitives to be processed (rendered) by the graphics processing pipeline. For example, each set of indices may comprise three indices indexing three vertices that define a triangular primitive.

The index buffer data may be stored by the host processor in an index buffer in the external memory. Thus, in various embodiments, the method comprises the host processor storing a set of index buffer data in the index buffer in the external memory (and the graphics processor then reading blocks of the index buffer data from the index buffer in the external memory).

The index buffer data may be stored in the index buffer in any suitable manner, e.g. in an uncompressed form. Each index of the index data may be represented using any suitable representation, such as for example an (e.g. unsigned) integer representation. Each representation may have any suitable precision N (number of bits), such as for example 8 bits (N=8), 16 bits (N=16), 32 bits (N=32), 64 bits (N=64), or 128 bits (N=128). Thus, each representation may comprise a sequence of N bits (e.g. sequence of 32 bits). In various particular embodiments, each index is represented either using a 32-bit integer representation, a 16-bit integer representation, or an 8-bit integer representation.

The graphics processor is configured to read the index buffer in the external memory by reading blocks of the index buffer data, i.e. by reading the index buffer on a block by block basis. The graphics processor reading each block of index buffer data may comprise the graphics processor receiving each block of index buffer data from the index buffer (in the external memory) via the memory bus.

Each block of index buffer data (otherwise known as a "cache line") comprises a (different) portion of the index buffer data stored in the index buffer, e.g. where each block has a certain size (or "width"). The size (width) of each block (cache line) may be defined by the configuration of the memory system (by the width of the memory bus), e.g. as being the amount of data that the memory bus can provide (to the graphics processor) per read operation (in a single clock cycle).

Each block of data (cache line) may have any suitable size (width). For example, in various embodiments, each block of data (cache line) (and the width of the memory bus) may comprise 512 bits. However, it would be possible for each block of data (cache line) (and the width of the memory bus) to comprise some other amount of data, such as for example 128 bits, 256 bits, 1024 bits, and so on.

Each block of data will include plural indices of the index data (and plural sets of indices, i.e. where each set of indices comprises a sequence of indices indexing a set of vertices that defines a primitive). Thus, for example, where each block of data (cache line) comprises 512 bits, and where each index is represented by a 32-bit representation, each block of data (cache line) may comprise 16 indices. Other arrangements would, of course, be possible.

The graphics processor is configured to compress one or more or each block of index buffer data. The compression will be described in more detail below.

The graphics processor is also configured to store each compressed block of index buffer data in its internal memory, e.g. for later use in its graphics processing operations. The graphics processor may also be configured to store uncompressed blocks of index buffer data in its internal memory (as will be described in more detail below). In general the graphics processor may be configured to store each read block of index buffer data in its internal memory, where each read block of index buffer data is either stored in a compressed form or in an uncompressed form.

The internal memory of the graphics processor may comprise any suitable memory that is internal to the graphics processor (i.e. on-chip). In various embodiments, the internal memory comprises a random access memory (RAM).

The internal memory may form part of a read stage of the graphics processor, i.e. may comprise a read buffer. The internal memory may be configured such that blocks of index buffer can be read from the internal memory in order, even when blocks of index buffer data arrive at and are stored in the internal memory out of order.

The internal memory may have any suitable size, and any suitable width. The "width" of the internal memory is the maximum amount of data that the internal memory is capable of storing in a single clock cycle. The "size" of the internal memory is the maximum total amount of data that the internal memory is capable of storing at any given time.

In various embodiments, the width of the internal memory may be less than the width of the memory bus (i.e. less than the size of a block of data (cache line)). Configuring the internal memory to be relatively "narrow" in this manner allows the internal memory to be implemented in an efficient manner, e.g. utilising a relatively small amount of semiconductor area in the graphics processor, and therefore having relatively low cost and power requirements. This can be beneficial, e.g. especially where it is desirable to reduce the cost and power requirements of the graphics processor, e.g. in portable devices where power may be limited.

In various embodiments, the width of the internal memory is some fraction of the width of the memory bus (i.e. of the size of a block of data (cache line)). For example, the width of the internal memory may be half, quarter, an eighth, etc., of the width of the memory bus. In various particular embodiments (e.g. where the width of the memory bus (and the size of a block of data (cache line)) is 512 bits), the width of the internal memory is 128 bits. However, it would be possible for the internal memory to have some other width, such as for example 32 bits, 64 bits, 256 bits, and so on.

In embodiments, the size of the internal memory is sufficient to store a plurality of blocks of index buffer data. As will be described in more detail below, some blocks of index buffer data may be stored in the internal memory in an uncompressed form, and so in embodiments, the size of the internal memory is sufficient to store a plurality of uncompressed blocks of index buffer data. In various embodiments, the size of the internal memory is sufficient to store some integer number of (uncompressed) blocks of index buffer data, such as for example 16 (uncompressed) blocks of index buffer data. For example, where each block of data (cache line) (and the width of the memory bus) comprises 512 bits, and where the width of the internal memory is 128 bits, the size of the internal memory may be 64*128 bits. Thus, internal memory may be a 64 entry 128-bit wide RAM. Other arrangements would, of course, be possible. For example, the internal memory may have a size that is sufficient to store any (integer) number of (uncompressed) blocks of index buffer data, such as e.g. 4, 8, 32 (and so on) (uncompressed) blocks of index buffer data.

As well as reading index buffer data, the graphics processor may be configured to read, from the vertex buffer in the external memory, (blocks of) vertex buffer data. The graphics processor may store the (blocks of) vertex buffer data in an internal memory of the graphics processor such as a RAM (which may be the same as or different to the internal memory (RAM) in which the index buffer data is stored), e.g. for (later) use in its graphics processing operations.

Once the graphics processor has read index buffer data (and vertex buffer data) and stored it in its internal memory, the graphics processor may then use the stored data in its graphics processing operations. (Where needed, the graphics processor may decompress compressed blocks of data before use, as will be described in more detail below). In particular, the data may be provided to and processed by the graphics processing pipeline of the graphics processor.

The graphics processing pipeline may comprise any suitable graphics processing pipeline such as a tile-based graphics processing pipeline. The graphics processing pipeline is internal to the graphics processor (on-chip). The graphics processing pipeline may in general comprise a vertex shading pipeline, followed by a fragment shading pipeline.

The vertex shading pipeline may be configured to receive the vertex buffer data, e.g. comprising attributes of a plurality of vertices (which may be defined for a given graphics processing output, e.g. draw call), and to subject them to vertex shading operations that may operate to transform the attributes for each vertex into a desired form for the fragment shading pipeline.

The vertex shading operations performed by the vertex shading pipeline may generate a set of output vertex attributes (i.e. appropriately "shaded" attributes) for use in the fragment shading pipeline.

The fragment shading pipeline may be configured to use the vertex shaded attributes to generate and define (to assemble) a plurality of primitives for processing, and to subject the primitives to processing in order, e.g., to display the frame.

To do this, the fragment shading pipeline may be configured to perform rasterisation, e.g. by determining which sampling points of an array of sampling points covering the output area to be processed are covered by a primitive, and rendering, e.g. by determining the appearance each sampling point should have (e.g. in terms of its colour, etc.) to represent the primitive at that sampling point.

In these embodiments, the index buffer data may be used, in particular, during the vertex shading operations and/or during the primitive assembly operations. The index buffer data may be needed during these operations to define each primitive (triangle) of the plurality of primitives that are to be processed (e.g. rendered) by the graphics processing pipeline. Thus, in embodiments, each stored block of index buffer data is used by the graphics processing pipeline to define primitives in the vertex shading operations and/or in the primitive assembly operations.

As described above, the Applicant has recognised that it is often necessary for a graphics processor to read a large amount of index buffer data during the vertex shading operations and/or primitive assembly operations, but it can often be the case that blocks of index buffer data (cache lines) received by the graphics processor from the external memory (via the memory bus) are wider than the width of the graphics processor's internal memory (i.e. comprise more data than the maximum amount of data that the graphics processor's internal memory is capable of storing in a single clock cycle).

As also described above, the index buffer data is typically stored in the index buffer (in the external memory) in an uncompressed form (and/or is provided to the graphics processor via the memory bus in that form), but the index buffer data can be highly compressible.

In accordance with various embodiments, the graphics processor is configured to compress blocks of index buffer data, and to store compressed blocks of index buffer data in its internal memory. In particular, the graphics processor may be configured to compress blocks of index buffer data such that each compressed block of index buffer data can be stored in the graphics processor's internal memory in a single clock cycle, or in a reduced number of clock cycles compared to the number of clock cycles required for an uncompressed block of index buffer data.

This means that the graphics processor of various embodiments (on average) requires fewer clock cycles to store a block (cache line) of index buffer data in its internal memory. This in turn beneficially reduces the number of clock cycles during which the memory bus is occupied, and so can free up the bus for other uses. This in effect increases the usable bandwidth on the bus.

Furthermore, the graphics processor is itself configured to compress blocks of index buffer data, thereby obviating any need for significant changes to other parts of the overall graphics processing system, and allowing particularly straightforward and efficient compression schemes to be used. The graphics processor can therefore read index buffer data at a relatively fast rate, and in a manner that is particularly efficient in terms of cost, memory bandwidth and power usage.

The graphics processor may be configured to compress blocks of index buffer data in any suitable manner.

The Applicant has found that the index buffer data can be significantly compressed. This is because each index in the index buffer is typically represented using a relatively high precision representation (e.g. a 32-bit or 16-bit representation), while the values of the indices in the index buffer can be highly correlated (e.g. since it is often the case that a primitive is formed from vertices that are indexed with indices that are close together).

Indeed, the Applicant has found that for common applications, the index buffer data can be compressed (using a "hard" compression scheme such as entropy encoding (e.g. arithmetic encoding, Huffman encoding, and the like)) down to around 1 or 2 bits per index (e.g. from uncompressed index buffer data comprising 16 or 32 bits per index).

Thus, in various embodiments, the graphics processor is configured to compress blocks of index buffer data using entropy encoding such as arithmetic encoding, Huffman encoding, and the like, to form compressed versions of the blocks of data.

However, the Applicant has furthermore recognised that although such "hard" compression schemes can achieve a high compression rate, other compression schemes may be better suited in this context of a graphics processor compressing index buffer data.

This is because "hard" compression schemes such as entropy encoding are generally serial in nature. This means that an index may only be encoded when another related, e.g. immediately preceding, index has been encoded (and that an index may only be decoded when another related, e.g. immediately preceding, index has been decoded). However, in various embodiments, it may be desirable for the graphics processor to be able to encode and/or decode multiple indices in parallel. Equally, "hard" compression schemes such as entropy encoding may require a significant amount of resources to implement in the graphics processor, e.g. in terms of semiconductor area, cost and/or power usage.

Thus, in various embodiments, the compression scheme comprises a compression scheme that allows multiple indices to be encoded and/or decoded in parallel (i.e. a parallel compression scheme). Equally, in various embodiments, the compression scheme comprises a relatively straightforward compression scheme that does not require a large amount of resources to implement.

The (parallel) compression scheme may take any suitable form.

For example, the (each) block may be compressed using a difference (delta) encoding scheme. In these embodiments, one (or more) particular index of the indices in a block (such as for example the first index of the block) may be encoded in its uncompressed form, while some or all of the other indices in the block may be encoded using a difference (delta) value relative to the particular index. To do this, each index may be compared to the one particular index so as to determine the difference between that index and the particular index. This will result in a set of difference values (i.e. so-called "delta" values), where each difference value corresponds to an index value of the block. Where the values of the indices in a block are close together, the delta values will be small and so can be encoded and stored in fewer bits than the indices themselves. The compressed version of the block of index buffer data may accordingly be formed from the set of difference (delta) values (together with one (or more) uncompressed index value).

However, the Applicant has found that improved compression schemes can be designed in this context of a graphics processor compressing index buffer data.

As described above, each block of data (cache line) may include plural indices of the index data (such as e.g. 16 indices), and each index may be represented by a respective representation (e.g. an integer representation) comprising a sequence of N bits (such as e.g. a sequence of 8, 16 or 32 bits).

The Applicant has recognised that as the values of the indices in each block are typically similar, it can often be the case that the representations for all of the indices in a block of index buffer data will be the same or similar, in respect of at least some bits. For example, the upper bits of the representations in a block will often be the same (or very similar) for all of the indices in the block, with the differences between the values of the indices in a block being apparent only (or predominantly) in the lower bits of their representations.

It can also be the case, especially where each index in the index buffer is represented using a relatively high precision representation (e.g. a 32-bit representation), that certain bits of all of the representations in a block are all zero. For example, the most significant bits of the representations in a block can often all be zero for all of the indices in a block.

The Applicant has recognised that these properties can be exploited to design a relatively straightforward and efficient compression scheme (that does not require a large amount of resources to implement), e.g. such that blocks of index buffer data can be compressed in a way that allows each compressed block of index buffer data to be stored in the graphics processor's internal memory in a single clock cycle, or in a reduced number of clock cycles compared to the number of clock cycles required for an uncompressed block of index buffer data.

In embodiments, the (each) block of data (cache line) is divided (de-interleaved) into two or more sub-blocks such that each resulting sub-block includes some of the bits (a sub-set of bits) from each of the index representations in the (original) block. The (sub-set of) bits from each index representation that are included in each sub-block may comprise corresponding (sub-sets of) bits. In other words, each index representation in the block may be divided (in the same manner as each other index representation), into two or more sub-sets of bits, e.g. where each sub-set comprises a contiguous sub-set of bits of the sequence of bits that form the representation. Corresponding sub-sets for each index representation may be combined to form each of the two or more sub-blocks.

For example, a first sub-block may be formed from a higher (contiguous) sub-set of bits (such as the higher most bits) of each index representation in the block, and a second sub-block may be formed from a lower (contiguous) sub-set of bits (such as the lower most bits) of each index representation in the block. One or more further sub-blocks may optionally be formed from one or more intermediate (contiguous) sub-set of bits of each index representation in the block.

In these embodiments, the (each) block of data (cache line) may be divided (de-interleaved) into two (and only two) sub-blocks, or the (each) block of data (cache line) may be divided (de-interleaved) into more than two sub-blocks, such as for example four, eight (or more) sub-blocks.

Where the (each) block of data (cache line) is divided (de-interleaved) into two (and only two) sub-blocks, a first sub-block may be formed from the n higher most bits of each index representation in the block, and a second sub-block may be formed from the m lower most bits of each index representation in the block (i.e. where n+m=N).

Where the (each) block of data (cache line) is divided (de-interleaved) into four sub-blocks, a first sub-block may be formed from the p higher most bits of each index representation in the block, a second sub-block may be formed from the q next higher most bits of each index representation in the block, a third sub-block may be formed from the n next higher most bits of each index representation in the block, and a fourth sub-block may be formed from the m lower most bits of each index representation in the block (i.e. where n+m+p+q=N).

The number of sub-blocks into which the (each) block of data (cache line) is divided can be selected as desired, e.g. based on the number of bits (N) that make up each index representation.

For example, the (each) block of data may be divided into relatively more sub-blocks when each index in the index buffer is represented using a relatively high precision representation (e.g. such as a 32-bit representation), and the (each) block of data may be divided into relatively fewer sub-blocks when each index in the index buffer is represented using a relatively low precision representation (e.g. such as a 16-bit representation). In various particular embodiments, the (each) block of data is divided into four sub-blocks when each index in the index buffer is represented using a relatively high precision representation (e.g. such as a 32-bit representation), and the (each) block of data is divided into two sub-blocks when each index in the index buffer is represented using a relatively low precision representation (e.g. such as a 16-bit representation). Other arrangements would be possible.

The division of the bits of each index representation into each sub-block may be done as desired. For example, the bits of each index representation may be shared equally among each of the two or more sub-blocks (e.g. n=m, or n=m=p=q). However, the division of the bits into each sub-block need not be equal, and in various embodiments is not equal.

In embodiments, the division of the bits into each sub-block may be selected based on the (expected) nature of the index representations. For example, it may be the case that a relatively large number of higher bits are (on average) similar, with the differences between the indices in the block being apparent predominantly in a smaller number of lower bits. In this case, it may be beneficial for the compression to separate the higher similar bits from the lower dissimilar bits, e.g. by dividing (de-interleaving) the block into a first sub-block of the n higher bits, and a second sub-block of the m lower bits, where n>m. However, other arrangements would be possible.

In this regard, the Applicant has found that for "real-world" index buffer data, where each index representation comprises (a sequence of) 16 bits (N=16), a particularly suitable division is to form each first sub-block from the 11 higher most bits of each index representation (n=11), and to form each second sub-block from the 5 lower most bits of each index representation (m=5). Other arrangements would, however, be possible.

Where each index representation of the index buffer data comprises a higher precision representation, it would be possible to treat each index representation in a similar manner, i.e. by forming each first sub-block from the (N-m) higher most bits of each index representation, and by forming each second sub-block from the (e.g. 5) lower most bits of each index representation (m=5). For example, where each index representation comprises a 32-bit representation (N=32), it would be possible to form each first sub-block from the 27 higher most bits of each index representation (n=27), and to form each second sub-block from the 5 lower most bits of each index representation (m=5).

However, the Applicant has found that an improved compression scheme can be created by, in effect, treating each higher precision index representation as a combination of multiple lower precision representations (e.g. by treating each 32-bit index representation as a combination of two 16-bit representations).

In these embodiments, each block of index buffer data may be initially (evenly) divided (de-interleaved) into a first initial sub-block formed from the (e.g. 16) higher most bits of each index representation in the block, and a second initial sub-block formed from the (e.g. 16) lower most bits of each index representation in the block. Each of the first and second initial sub-blocks may then be further divided (de-interleaved) into two sub-blocks (i.e. for a total of four sub-blocks).

Thus, the first initial sub-block may be divided (de-interleaved) into a first sub-block formed from the (e.g. 11) higher most bits of each representation in the first initial sub-block, and a second sub-block formed from the (e.g. 5) lower most bits of each representation in the first initial sub-block. Similarly, the second initial sub-block may be divided (de-interleaved) into a third sub-block formed from the (e.g. 11) higher most bits of each representation in the second initial sub-block, and a fourth sub-block formed from the (e.g. 5) lower most bits of each representation in the second initial sub-block.

In other words, the (each) block of index buffer data (cache line) is divided (de-interleaved) into four sub-blocks, where a first sub-block is formed from the (e.g. 11) higher most bits of each index representation in the block, a second sub-block is formed from the (e.g. 5) next higher most bits of each index representation in the block, a third sub-block is formed from (e.g. 11) next higher most bits of each index representation in the block, and a fourth sub-block is formed from the (e.g. 5) lower most bits of each index representation in the block.

In these embodiments, each of the two or more sub-blocks into which the (each) block of index buffer data is divided will (on average) have different properties, e.g. particularly in terms of the variation of the values in each sub-block. One or more of the sub-blocks may (on average) have a relatively high degree of variation in its values, and one or more other sub-blocks may (on average) have a relatively low degree of variation in its values. For example, the sub-block that comprises the (m) lower most bits of each index representation may (on average) have a relatively high degree of variation in its values, since (as described above) the differences between the indices may be apparent predominantly in these bits. In contrast, other sub-blocks, such as the sub-block that comprises the higher most bits of each index representation, may (on average) have a relatively low degree of variation in their values.

The Applicant has recognised that sub-blocks that have relatively low degree of variation will be more compressible than sub-blocks that have relatively high degree of variation, and that this means that a particularly straightforward and efficient compression scheme can be created by compressing only the sub-blocks that (on average) have relatively low degree of variation, and not (other than) compressing the sub-blocks that (on average) have relatively high degree of variation.

Thus, in embodiments, the (each) block of data is compressed by compressing one or more of the sub-blocks into which the block is divided (de-interleaved). One or more other of the sub-blocks into which the block is divided (de-interleaved) may not be (may other than be) compressed. In various particular embodiments, one or more sub-blocks that (on average) have a relatively low degree of variation are compressed, and one or more sub-blocks that (on average) have relatively high degree of variation are not (are other than) compressed.

Thus for example, where (as described above), the (each) block of index buffer data is divided (de-interleaved) into two sub-blocks (a first and a second sub-block), the (each) block of index buffer data may be compressed by compressing the first sub-block, and not (other than) compressing the second sub-block. Equally, where (as described above), the (each) block of index buffer data is divided (de-interleaved) into four sub-blocks (a first, second, third and fourth sub-block), the (each) block of index buffer data may be compressed by compressing the first and/or third sub-blocks, and not (other than) compressing the second and/or fourth sub-blocks.

In these embodiments, a sub-block may be compressed in any suitable manner. In particular embodiments, a sub-block may be compressed using a difference (delta) encoding scheme.

In these embodiments, one (or more) particular index of the indices in a sub-block (such as for example the first index of the sub-block) may be encoded in its uncompressed form, while some or all of the other indices in the sub-block may be encoded using a difference (delta) value relative to the particular index. To do this, each index may be compared to the one particular index so as to determine the difference between that index and the particular index. This will result in a set of difference values (i.e. so-called "delta" values), where each difference value corresponds to an index value of the sub-block. Where the values in a sub-block are close together, the delta values will be small and so can be encoded and stored in fewer bits than the index values themselves. The compressed version of the sub-block may accordingly be formed from the set of difference (delta) values (together with one (or more) uncompressed index value).

Thus, in various particular embodiments, a block of index buffer data is compressed by dividing (de-interleaving) the block into two or more sub-blocks, and compressing one or more of the sub-blocks, e.g. using a difference (delta) encoding scheme, and not compressing (other than compressing) one or more other of the sub-blocks. The compressed version of the block of index buffer data (that is stored in the internal memory of the graphics processor) may accordingly comprise a compressed version of one or more sub-blocks and an uncompressed version of one or more other sub-blocks.

In these embodiments, although certain sub-blocks of each block of index buffer data may be expected to (on average) have a relatively low degree of variation, this may not be the case for each and every block of index buffer data. For a block of index buffer data having a sub-block whose degree of variation is (significantly) higher than average, the compression may be relatively ineffective. It may therefore be desirable to detect such instances, and to avoid compressing such sub-blocks. This can, e.g., reduce the processing requirements for the compression scheme, and therefore reduce cost and power usage.

Thus, in embodiments, for each sub-block (of the sub-blocks that may be compressed) (e.g. for each first and/or third sub-block), it may be determined whether or not the (first and/or third) sub-block should be compressed. The determination may be made on the basis of the degree of variation of the (e.g. first and/or third) sub-block. Where it is determined that the sub-block should be compressed (i.e. where the degree of variation of the sub-block is relatively small), the sub-block in question may be compressed. Where, however, it is determined that the sub-block should not be (should other than be) compressed (i.e. where the degree of variation of the sub-block is relatively large), the sub-block in question may be not (may be other than) compressed.

In other words, for the (each) block of index buffer data, it may be determined whether or not the block should be compressed. The determination may be made on the basis of the degree of variation of one or more of the sub-blocks into which the block of index buffer data is divided (e.g. based on the degree of variation of the first and/or third sub-blocks). Where it is determined that the block of index buffer data should be compressed (i.e. where it is determined that a sub-block of the block should be compressed), the block of index buffer data may be compressed so as to form a compressed version of the block of index buffer data, and the compressed block of index buffer may then be stored in the internal memory of the graphics processor. Where, however, it is determined that the block of index buffer data should not be (should other than be) compressed (i.e. where it is determined that none of the sub-blocks of the block should be compressed), the block of index buffer data may not be (may other than be) compressed, and the uncompressed block of index buffer data may be stored in the internal memory of the graphics processor.

In these embodiments, the determination of whether or not a sub-block should be compressed (and so of whether or not a block of index buffer data should be compressed) may be made using a threshold degree of variation (of the, e.g. first and/or third, sub-block). Where a sub-block has a degree of variation less than or equal to the threshold, then the sub-block (and so the block of index buffer data) may be compressed. Where, however, a sub-block has a degree of variation greater than the threshold, then the sub-block may not be (may other than be) compressed.

The threshold degree of variation may be selected as desired. For example, the threshold may be set as ±1. Thus, in various particular embodiments, where all of the values in a sub-block differ by −1, 0 or +1, it may be determined that the sub-block should be compressed (and the sub-block may be compressed, as described above). Where values in a sub-block differ by amounts other than −1, 0 or +1 (e.g. where values in a sub-block differ by more than ±1), it may be determined that the sub-block should not be (should other than be) compressed (and the sub-block may not be compressed, as described above). Other thresholds would, however, be possible.

In these embodiments, where a sub-block is compressed using a difference (delta) encoding scheme (as described above), each difference (delta) value will take one of three values, i.e. one of −1, 0 or +1. In various particular embodiments, each difference value is encoded using a so-called "trit" (i.e. an item that can take three values), e.g. as described in US 2012/0281005 (Arm Limited), the contents of which are incorporated herein by reference. This represents a particular efficient technique for encoding such difference (delta) values. The compressed version of the sub-block may accordingly be formed from a set of trits, each encoding a difference (delta) value (together with one (or more) uncompressed index value).

As described above, it can be the case (especially where each index in the index buffer is represented using a relatively high precision representation (e.g. a 32-bit representation)), that certain bits for all of the representations in a block of index buffer data are all zero. For example, the most significant bits of the representations in a block of index buffer data can all be zero for all of the indices in the block. This means that it can be the case that all of the bits in a sub-block are all zero.

The Applicant has recognised that an improved compression scheme can be created by not storing (by other than storing) sub-blocks whose bits are all zero. Thus, in embodiments, one or more or each block of index buffer data may be compressed in such a way that the compressed version of the block of index buffer data omits one or more of the sub-blocks into which the block is divided (de-interleaved), e.g. where the one or more sub-blocks that are omitted are sub-blocks comprising all zeroes.

In embodiments, for one or more or each sub-block into which a block is divided, it may be determined whether the sub-block comprises all zeroes. Where it is determined that a sub-block comprises all zeroes, that sub-block need not be (and embodiments is not) stored (in the internal memory of the graphics processor). Where it is determined that a sub-block does not comprise all zeroes, that sub-block may be compressed (or not) in the manner described above. This will mean that the compressed version of the block of index buffer data may omit one or more sub-block(s) of the block of index buffer data that comprise all zeroes.

In various particular embodiments, (where the (each) block of index buffer data is divided into a first initial sub-block formed from the (e.g. 16) higher most bits of each index representation in the block, and a second initial sub-block formed from the (e.g. 16) lower most bits of each index representation in the block), for each initial sub-block, it may be determined whether or not the initial sub-block comprises all zeroes. Where it is determined that an initial sub-block comprises all zeroes, that initial sub-block (and its sub-blocks) need not be (and embodiments is not) stored (in the internal memory of the graphics processor). Where it is determined that an initial sub-block does not comprise all zeroes, that initial sub-block (and its sub-blocks) may be compressed (or not) in the manner described above. This will mean that the compressed version of the block of index buffer data may omit an initial sub-block of the block of data (which initial sub-block comprises all zeroes).

Thus, in various particular embodiments, a block of index buffer data is compressed by dividing (de-interleaving) the block into two or more sub-blocks, determining whether one or more of the sub-blocks comprises all zeroes, and discarding one or more of the sub-blocks that comprises all zeroes.

It will be appreciated from the above that, according to various particular embodiments, each block of index buffer data read by the graphics processor is subjected to the following steps by the graphics processor.

Firstly, each block of index buffer data is divided into a first initial sub-block formed from the (e.g. 16) higher most bits of each index representation in the block, and a second initial sub-block formed from the (e.g. 16) lower most bits of each index representation in the block.

It may then be determined whether the first and/or second initial sub-block comprises all zeroes. Where an initial sub-block comprises all zeroes, that initial sub-block is not (is other than) stored (in the internal memory of the graphics processor), i.e. so that the compressed version of the block of data omits that initial sub-block.

Where an initial sub-block does not comprise all zeroes, that initial sub-block may be divided into a first sub-block formed from the (e.g. 11) higher most bits of each index representation in the initial sub-block, and a second sub-block formed from the (e.g. 5) lower most bits of each index representation in the initial sub-block.

For each so-formed first sub-block, it may then be determined whether or not the first sub-block should be compressed. The determination may be made on the basis of the degree of variation of the first sub-block (as described above). Where it is determined that the first sub-block should be compressed (i.e. where the degree of variation of the sub-block is relatively small), the first sub-block may be compressed (e.g. as described above), and stored (in the internal memory of the graphics processor) in a compressed form. Where, however, it is determined that the first sub-block should not be compressed (i.e. where the degree of variation of the first sub-block is relatively large), the sub-block may be not (may be other than) compressed, and is stored (in the internal memory of the graphics processor) in an uncompressed form.

Each so-formed second sub-block is not (is other than) compressed, and is stored (in the internal memory of the graphics processor) in an uncompressed form.

It will be appreciated from the above, that according to the compression scheme of various embodiments, in respect of each sub-block that a block of index buffer data is divided into, the sub-block may be determined as being either (i) formed from all zeroes; (ii) to be compressed; or (iii) not to be compressed. Equally, the compressed version of the block of index buffer data may include one or more compressed sub-blocks, one or more uncompressed sub-blocks, and may omit one or more sub-blocks of the block of data (which omitted sub block(s) comprises all zeroes).

The Applicant has recognised that an improved compression scheme can be created by defining a set of possible layouts for storing each (compressed or uncompressed) block of index buffer data in the internal memory of the graphics processor. Each (compressed or uncompressed) block of index buffer data may be stored in the internal memory of the graphics processor using one layout of the set of possible layouts. The graphics processor may be configured to select one layout of the set of possible layouts for storing the (each) block of index buffer data (and to store the (each) block of index buffer data using the selected layout).

A first layout may be used where the first sub-block of one of the initial sub-blocks is compressed, while the other initial sub-block comprises all zeroes. In this case, the compressed version of the block of index buffer data may comprise a compressed version of an initial sub-block only (i.e. comprising a compressed first sub-block and an uncompressed second sub-block). As such, the compressed version of the block of index buffer data may be stored in the internal memory of the graphics processor by storing a compressed version of an initial sub-block only (and without storing the other initial sub-block that comprises all zeroes).

A second layout may be used where the first sub-block of both of the initial sub-blocks is compressed. In this case, the compressed version of the block of index buffer data may comprise compressed versions of each of the two initial sub-blocks (i.e. comprising two compressed first sub-blocks and two uncompressed second sub-blocks). As such, the compressed version of the block of index buffer data may be stored in the internal memory of the graphics processor by storing compressed versions of each of the two initial sub-blocks.

A third layout may be used where one initial sub-block is (entirely) uncompressed, while the other initial sub-block comprises all zeroes. In this case, the compressed version of the block of index buffer data may comprise an uncompressed version of an initial sub-block only (i.e. comprising an uncompressed first sub-block and an uncompressed second sub-block). As such, the compressed version of the block of index buffer data may be stored in the internal memory of the graphics processor by storing an uncompressed version of an initial sub-block only (and without storing the other initial sub-block that comprises all zeroes).

A fourth layout may be used where none of the first to third layouts are applicable. In this case, an uncompressed version of the block of index buffer data may be stored in the internal memory of the graphics processor, e.g. by storing uncompressed versions of both of the initial sub-blocks (i.e. comprising two uncompressed first sub-blocks and two uncompressed second sub-blocks).

The Applicant has found that the first layout can lead to an effective compression rate of 4:1. This means that the compressed version of the block of index buffer data will require ¼ of the number of clocks cycles to be stored in the internal memory of the graphics processor (when compared with an uncompressed block of index buffer data). For example, where an uncompressed block of index buffer data would require 4 clock cycles to be stored in the internal memory of the graphics processor (as described above), the compressed version of the block of index buffer data will only require a single clock cycle to be stored.

Similarly, the second and third layouts lead to an effective compression rate of 2:1. This means that the compressed version of the block of index buffer data will require ½ of the number of clocks cycles to be stored in the internal memory of the graphics processor (when compared with an uncompressed block of index buffer data). For example, where an uncompressed block of index data would normally require 4 clock cycles to be stored in the internal memory of the graphics processor (as described above), the compressed version of the block of index buffer data will only require two clock cycles to be stored.

The fourth layout is an uncompressed layout (i.e. having a compression rate of 1:1), and so will require the same number (e.g. 4) of clock cycles to be stored in the internal memory of the graphics processor.

The Applicant has furthermore found that, for typical "real-world" index buffer data, a significant majority of blocks of index buffer data can be compressed and stored using the first layout. In particular, testing on "real-world" data indicated that, for 32-bit index representations, the first layout is applicable to about 97% of blocks of index buffer data. This means that a significant majority of blocks of index buffer data will only require a single clock cycle to be stored in the internal memory of the graphics processor. Equally, for 16-bit index representations, the second layout is applicable most of the time, meaning that most blocks of index buffer data will only require a single clock cycle to be stored in the internal memory of the graphics processor.

It will accordingly be appreciated that the compression scheme of various embodiments allows the graphics processor to compress blocks of index buffer data in such a way that each compressed block of index buffer data can be stored in the graphics processor's internal memory in a single clock cycle, or in a reduced number of clock cycles compared to the number of clock cycles required for an uncompressed block of index buffer data. The graphics processor of various embodiments accordingly (on average) requires fewer clock cycles to store a block (cache line) of index buffer data in its internal memory. This in turn beneficially reduces the number of clock cycles during which the memory bus is occupied, and so can free up the bus for other uses. This in effect increases the usable bandwidth on the bus.

Furthermore, the compression scheme of various embodiments is particularly straightforward and efficient in terms of processing requirements, and does not require significant changes to other parts of the overall graphics processing system.

This means that the graphics processor can read index buffer data at a relatively fast rate, and in a manner that is particularly efficient in terms of cost, memory bandwidth and power usage.

The compression scheme of various embodiments can be further improved by reserving an encoding value for the special value used to indicate a primitive-restart. A primitive restart is commonly indicated in index buffer data using a representation that can be significantly different to the index values. For example, it is common to indicate a primitive restart using a representation comprising all ones. The presence of such a representation can lead to poor compression. For example, where a difference (delta) encoding scheme is used, an all-ones representation may lead to large difference (delta) values, and therefore poor compression.

Therefore, in embodiments, it is determined whether a primitive restart is present in the index buffer data. When a primitive restart is determined as being present in the index buffer data, a special encoding value is used to encode the primitive-restart.

Any suitable encoding value can be used for this. For example, where (as described above), each index value is encoded using a difference (delta) value (e.g. a trit) and a set of (m) uncompressed bits, a primitive-restart can be indicated using a combination of a particular difference (delta) value and a particular set of (m) uncompressed bits. For example, a primitive-restart can be indicated using a different (trit) value of +1 and an uncompressed bits value of 11111. Other arrangements would, of course, be possible.

As described above, once the index buffer data has been stored in the internal memory of the graphics processor, it may then be used in the vertex shading operations and/or in the primitive assembly operations.

Where a block of index buffer data is stored in the internal memory of the graphics processor in an uncompressed form, it may be used in the normal manner, i.e. by the graphics processor reading the uncompressed block of index buffer data from its internal memory, and using the block of index buffer data as appropriate.

Where, however, a compressed version of a block of index buffer data is stored in the internal memory of the graphics processor, the compressed version of a block of index buffer data may be decompressed before being used by the graphics processor for its vertex shading operations and/or primitive assembly operations.

Thus, the method may comprise the graphics processor reading the compressed version of the block of index buffer data from its internal memory, decompressing the compressed version of the block of index buffer data (so as to recover the uncompressed version of the block of index buffer data), and using the (uncompressed version of the) block of index buffer data, e.g. in its vertex shading operations and/or primitive assembly operations.

As such, the graphics processor should (an in embodiments does) comprise suitable compression circuitry configured to compress the (each) block of index buffer data, and suitable decompression circuitry configured to decompress the (each) block of index buffer data.

Where, as described above, each (compressed or uncompressed) block of index buffer data is stored in the internal memory of the graphics processor using one layout of a set of possible layouts, the graphics processor may need to determine which layout(s) has been used in order to allow it to correctly read and optionally decompress each block of index buffer data.

In various particular embodiments, this is done by the graphics processor producing and storing, e.g. in association with each stored (compressed or uncompressed) block of index buffer data, metadata indicating which layout of the set of possible layouts has been used to store each (compressed or uncompressed) block of index buffer data.

Thus, in embodiments, the graphics processor is configured to select one layout of the set of possible layouts for storing the (each) block of index buffer data (and to store the (each) block of index buffer data using the selected layout), and to produce and store (e.g. in association with each stored (compressed or uncompressed) block of index buffer data), metadata indicating which layout of the set of possible layouts has been selected for the (each) block of index buffer data.

The graphics processor may then be configured to read the metadata, e.g. together with the stored (compressed or uncompressed) index buffer data, and use the metadata to determine how to read and optionally decompress each block of index buffer data.

Although embodiments above have been described in terms of a single block of index buffer data being read from the index buffer in external memory and being compressed (and so on), in various particular embodiments this process is repeated for a sequence of plural blocks of index buffer data, e.g. for each and every block of index buffer data in a sequence of plural blocks of index buffer data that are read from the index buffer.

As described above, various particular embodiments are directed to methods in which blocks of index buffer data are stored in an internal memory of the graphics processor when the graphics processor receives the blocks index buffer data from external memory. In these embodiments, the internal memory may be part of the read circuitry of the graphics processor, and so may be a read buffer, where the read buffer is configured to store some (relatively small) integer number of blocks of index buffer data.

In various further embodiments, a second internal memory of the graphics processor may be configured to store a (much) larger number of blocks of index buffer data.

As described above, the index buffer data may be used, in particular, during both the vertex shading operations and during the primitive assembly operations. Thus, the index buffer data may be read in from the external memory twice by the graphics processor: once for the vertex shading operations and once for the primitive assembly operations.

However, the graphics processor reading in data from the external memory consumes memory bandwidth, and therefore power. As described above, it is often desirable to reduce the power requirements of graphics processors, especially e.g. in portable devices, where power may be limited.

Thus, in embodiments, index buffer data may be read in by the graphics processor from the external memory only once, used for the vertex shading operations, and stored in a (second) internal memory of the graphics processor. The stored index buffer data may then be used for the primitive assembly operations.

As also described above, the results of the vertex shading operations are required during the primitive assembly operations. However, the vertex shading operations can take a significant amount of time, e.g. several thousand clock cycles.

Therefore, in these embodiments, in order to avoid the primitive assembly operations stalling (by running out of index buffer data), it is necessary to store a relatively large amount of index buffer data in the (second) internal memory. For example, testing has shown that, for "real-world" graphics processing, approximately 3000 cycles worth of index buffer data may need to be stored in order to hide the latency of the vertex shading operations.

Storing this amount of index buffer data in a conventional form would require a very large internal memory. For example, where a single 32-bit index is used per clock cycle by the graphics processor (in its primitive assembly operations), the internal memory would need to have a size of around 3000*32 bits. Where the graphics processor is configured to use more than one index per clock cycle, the internal memory would need to be larger than this (e.g. where 12 32-bit indices are used per clock cycle by the graphics processor, the internal memory would need to have a size of around 3000*384 bits). However, such a large internal memory (e.g. RAM) would require a relatively large amount of semiconductor area in the graphics processor, and so would increase the overall cost and power requirements of the graphics processor.

Thus, in embodiments, the index buffer data may be read in once, used for the vertex shading operations, and stored in a compressed form within the (second) internal memory (e.g. RAM) of the graphics processor. The stored compressed index buffer data may then be decompressed and used for the primitive assembly operations. By storing compressed index buffer data, the size of the (second) internal memory, and so its cost and power requirements, can be beneficially reduced.

In these embodiments, blocks of index buffer data received from the external memory may be compressed and stored in a first internal memory of the graphics processor in the manner described above, or otherwise.

Equally, the compression scheme that is used to store the index buffer data in the second internal memory may be the same as or different to the compression scheme used to store the index buffer data in the first internal memory.

In these embodiments, the (second) internal memory may be well disconnected from the memory bus, and so the desirability for speed in compressing and storing the index buffer data may be less. This means that more advanced compression algorithms than those described above can be used, e.g. to obtain a higher degree of compression.

For example, the (each) block may be compressed using a difference (delta) encoding scheme, Huffman encoding, arithmetic encoding, and the like (e.g. as described above). Testing shows that the average encoding length for "real-world" index buffer data would be below 8 bits. This translates to a three times or better compression ratio, meaning that the total number of bits in the internal memory (e.g. RAM) can be reduced by a factor of three times or more.

Thus, in embodiments, the index buffer data can be compressed in the manner described above when initially read in by the graphics processor (or not), but can then be (re)compressed and stored in the second internal memory, e.g. using a more advanced compression algorithm.

Where the compression scheme that is used to store the index buffer data in the second internal memory is different to the compression scheme used to store the index buffer data in the first internal memory, the graphics processor may read in the index buffer data once (using the above described, first compression scheme), use the data for the vertex shading operations, compress the index buffer data (using the different compression scheme), and then store the index buffer data in a compressed form within the (second) internal memory (e.g. RAM) of the graphics processor. The stored compressed index buffer data may then be decompressed and used for the primitive assembly operations.

Where the compression scheme that is used to store the index buffer data in the second internal memory is the same as the compression scheme used to store the index buffer data in the first internal memory, the graphics processor may read in the index buffer data once, compress the index buffer data (using the above described, first compression scheme), decompress the compressed index buffer data and use the data for the vertex shading operations, and also store the compressed index buffer data within the (second) internal memory (e.g. RAM) of the graphics processor. In these embodiments, the data may only need to be compressed once, i.e. so that the compressed index buffer data that is initially stored in the first internal memory is then stored in the second internal memory without being decompressed. The stored compressed index buffer data may then be decompressed and used for the primitive assembly operations.

The graphics processor can execute any suitable and desired graphics processing pipeline, and may and in an embodiment does, include any suitable and desired processing circuits, processing logic, components and elements for that purpose.

The graphics processor and graphics processing pipeline may be, and in an embodiment are, a tile-based graphics processor and processing pipeline operable to generate tiles of an overall render output, e.g. frame.

The graphics processing pipeline that the graphics processor executes can include any suitable and desired processing stages for generating a (the) render output (e.g. frame). Thus, the graphics processing pipeline can include, and in an embodiment does include, in addition to the above described stages, any one or one or more, and in an embodiment all, of the other processing stages that graphics processing pipelines normally include. Thus, for example, the graphics processing pipeline in an embodiment also includes a vertex shading stage, a primitive setup stage, etc. Where the pipeline is a tile-based pipeline, the pipeline in an embodiment also comprises a tiling stage, and/or a write out unit that operates to write the data in the tile buffer (e.g. once the data in the tile buffer is complete) out to external (main) memory (e.g. to a frame buffer).

A (and each) processing stage (circuit) of the graphics processing pipeline (processor) can be implemented as desired, e.g. as a fixed function hardware unit (circuit) or as a programmable processing circuit (that is programmed to perform the desired operation).

As will be appreciated by those skilled in the art, the graphics processor of the technology described herein may be part of an overall graphics processing system that includes, e.g., and in an embodiment, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in an embodiment does, also execute a driver for the graphics processor and a compiler or compilers for compiling programs to be executed by the (programmable processing stage (shader) of the) graphics processor.

The graphics processor may also comprise, and/or be in communication with, one or more memories and/or memory devices that store the data described herein, and/or the output data generated by the graphics processor, and/or store software (e.g. shader) program) for performing the processes described herein. The graphics processor may also be in communication with a host microprocessor, and/or with a display for displaying images based on the data generated by the graphics processor.

Embodiments can be used for all forms of output that a data processor (and processing pipeline) may be used to generate. For example, in the case of graphics processing, the graphics processing pipeline may generate frames for display, render to texture outputs, etc. The output data values from the processing are in an embodiment exported to external, e.g. main, memory, for storage and use, such as to a frame buffer for a display.

Embodiments are applicable to any suitable form or configuration of graphics processor and graphics processing system. It is particularly applicable to tile based graphics processors and graphics processing systems. Thus in an embodiment, the graphics processor is a tile-based graphics processor (and pipeline).

In an embodiment, the various functions of the technology described herein are carried out on a single graphics processing platform that generates and outputs data (such as rendered fragment data that is, e.g., written to the frame buffer), for example for a display device.

Embodiments can be implemented in any suitable system, such as a suitably configured micro-processor based system. In an embodiment, the technology described herein is implemented in a computer and/or micro-processor based system.

Embodiments may be implemented in a portable device, such as a mobile phone or tablet.

The various functions of embodiments can be carried out in any desired and suitable manner. For example, the functions of embodiments can be implemented in hardware or software, as desired. Thus, for example, the various functional elements, stages, and "means" of embodiments may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of embodiments may be duplicated and/or carried out in parallel on a given processor. Equally, the various processing stages may share processing circuitry, etc., if desired.

It will also be appreciated by those skilled in the art that all of the described embodiments can include, as appropriate, any one or more or all of the optional features described herein.

The methods in accordance with embodiments may be implemented at least partially using software e.g. computer programs. It will thus be seen that when viewed from further embodiments the technology described herein provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

Embodiments also extend to a computer software carrier comprising such software which when used to operate a graphics processor, renderer or other system comprising data processing means causes in conjunction with said data processing means said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of embodiments need be carried out by computer software and thus from a further broad embodiment the technology described herein provides computer software and such software installed on a computer software carrier for carrying out at least one of the steps of the methods set out herein.

Embodiments may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Various embodiments of the technology described herein will now be described by way of example only and with reference to the accompanying drawings.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

Graphics processing is typically carried out in a pipelined fashion, with one or more pipeline stages operating on the data to generate the final render output, e.g. frame that is displayed.

In order to control a graphics processor (graphics processing unit) that is implementing a graphics processing pipeline to perform the desired graphics processing pipeline operations, the graphics processor will typically receive commands and data from a driver, e.g. executing on the host processor, that indicates to the graphics processor the operations that it is to carry out and the data to be used for those operations.

Accordingly, as shown in FIG. 1 (which shows a typical computer graphics processing system), an application 1, such as a game, executing on a host processor 2 that requires graphics processing operations to be performed by an associated graphics processing unit (graphics processing pipeline) 4, will generate appropriate API (Application Programming Interface) calls that are interpreted by a driver 3 for the graphics processor 4 that is running on the host processor 2 to generate appropriate instructions to the graphics processor 4 to generate graphics output required by the application 1.

To facilitate this, a set of instructions will be provided to the graphics processor 4 in response to instructions from the application 1 running on the host system 2 for graphics output (e.g. to generate a frame to be displayed). The driver 3 may send commands and data to the graphics processor 4 by writing to memory 5.

The data provided by the host 2 to the graphics processor 4 (and stored in the memory 5) will include at least vertex buffer data and index buffer data.

The set of vertices to be used for a given graphics processing output (e.g. frame for display, draw call, etc.) will be stored as a set of vertex data defining the vertices (e.g. the relevant attributes for each of the vertices). A set of vertex data defining the vertices to be used for generating a given graphics processing output is typically referred to as a vertex buffer.

Each primitive may be defined in terms of a set of indices that reference the vertices in the set of vertex data that make up that primitive. Thus, the set of primitives to be processed for a given graphics processing output will be defined by a set of indices that indicate the corresponding vertices in a set of vertex data (in a vertex buffer) that are to be used for the primitives in question. The set of indices that refer to the vertices and define the primitives to be processed is typically referred to as an index buffer.

Figure 2:
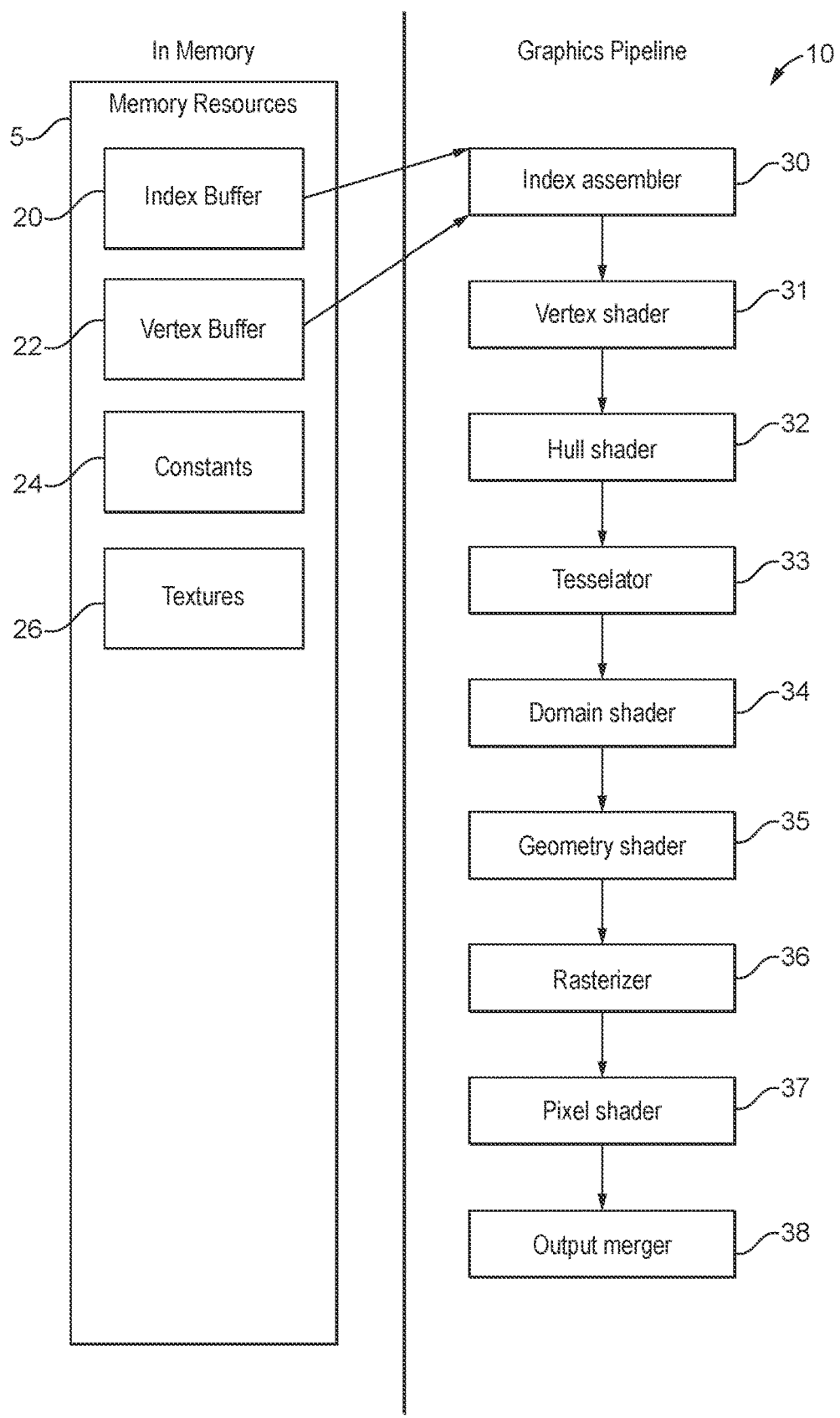
FIG. 2 shows schematically a graphics processing pipeline in accordance with various embodiments.

FIG. 2 shows an exemplary graphics processing pipeline 10 that may be executed by the GPU 4. The graphics processing pipeline 10 as illustrated in FIG. 2 is executed on and implemented by the graphics processing unit (GPU) (graphics processor) 4 that includes the necessary functional units, processing circuitry, etc., operable to execute the graphics processing pipeline stages.

FIG. 2 shows the main elements and pipeline stages of the graphics processing pipeline. As will be appreciated by those skilled in the art, there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 10 can receive data from the memory 5. As mentioned above, the data provided by the host 2 to the graphics processor 4 and stored in the memory 5 will include at least vertex buffer data and index buffer data. Thus, as shown in FIG. 2, the memory 5 includes an index buffer 20 configured to store index buffer data, and a vertex buffer 22 configured to store vertex buffer data. The memory may also store various constants 24 and texture 26 for use in the graphics processing pipeline's 10 graphics processing operations.

The graphics processing pipeline 10 shown in FIG. 2 includes a number of stages, including an input assembler 30, a vertex shader 31, a hull shader 32, a tesselator 33, a domain shader 34, a geometry shader 35, a rasteriser 36, a renderer in the form of a pixel shader 37, and an output merger stage 38.

The input assembler 30 reads index buffer data and vertex buffer data from the index buffer 20 and vertex buffer 22 in memory 5, and uses the read data to generate and define (to assemble) a plurality of primitives for processing.

The vertex shader 31 takes the input data values (vertex attribute values) associated with the vertices, etc., defined for the output to be generated, and processes those data values to generate a set of corresponding "vertex shaded" output data values for use by subsequent stages of the graphics processing pipeline. This may comprise transforming vertex position attribute values from the world or user space that they are initially defined for to the screen space that the output of the graphics processing system is to be displayed in, modifying the input data to take account of the effect of lighting in the image to be rendered, etc.

The hull shader 32 performs operations on sets of patch control points and generates additional data known as patch constants. The tessellation stage 33 subdivides geometry to create higher order representations of the hull, and the domain shader 34 performs operations on vertices output by the tessellation stage (similar to a vertex shader). The geometry shader 35 may (if run) generate primitives such as a triangles, points or lines for processing.

Once all the primitives to be rendered have been appropriately processed, e.g. transformed, and/or, e.g., generated by the geometry shader 35, the rasterisation stage 36 of the graphics processing pipeline 10 operates to rasterise the primitives into individual graphics fragments (or "pixels") for processing.

To do this, the rasteriser 36 rasterises each primitive to sampling points and generates graphics fragments having appropriate positions (representing appropriate sampling positions) for rendering the primitive.

The fragments generated by the rasteriser 36 are then sent to the pixel shading stage 37. The pixel shading stage 37 performs the appropriate fragment processing operations on the fragments, so as to process the fragments to generate the appropriate rendered fragment data. This fragment processing may include any suitable and desired pixel shading processes, such as executing fragment shader programs on the fragments, applying textures to the fragments, applying fogging or other operations to the fragments, etc., to generate the appropriate fragment data.

The fragment data is input to the output merger unit 38, and thence output (written back) to an external memory output buffer, such as a frame buffer of a display device (not shown). (The display device could comprise, e.g., a display comprising an array of pixels, such as a computer monitor or a printer.)

The output merger unit 38 can downsample the fragment data to the appropriate resolution for the output buffer (device) (i.e. such that an array of pixel data corresponding to the pixels of the output device is generated), to generate output values (pixels) for output to the output buffer.

Where the pipeline is a tile-based graphics processing pipeline, once a tile of the render output has been processed and its data exported to a main memory (e.g. to a frame buffer in a main memory) for storage, the next tile is then processed, and so on, until sufficient tiles have been processed to generate the entire render output (e.g. frame (image) to be displayed). The process is then repeated for the next render output (e.g. frame) and so on.

Other arrangements for a graphics processing pipeline would, of course, be possible.

The present embodiment is concerned particularly with the graphics processor 4 reading in blocks of index buffer data from the index buffer 20 in the external memory 5.

Index buffers are used in graphics processing to define an indirect relation between vertices and primitives. For example, to draw a triangle consisting of vertices 0, 1, and 5 in an array of vertices, an application may create an index buffer containing the values {0, 1, 5}. The GPU must read this buffer to determine how to construct the primitive.

Figure 3:
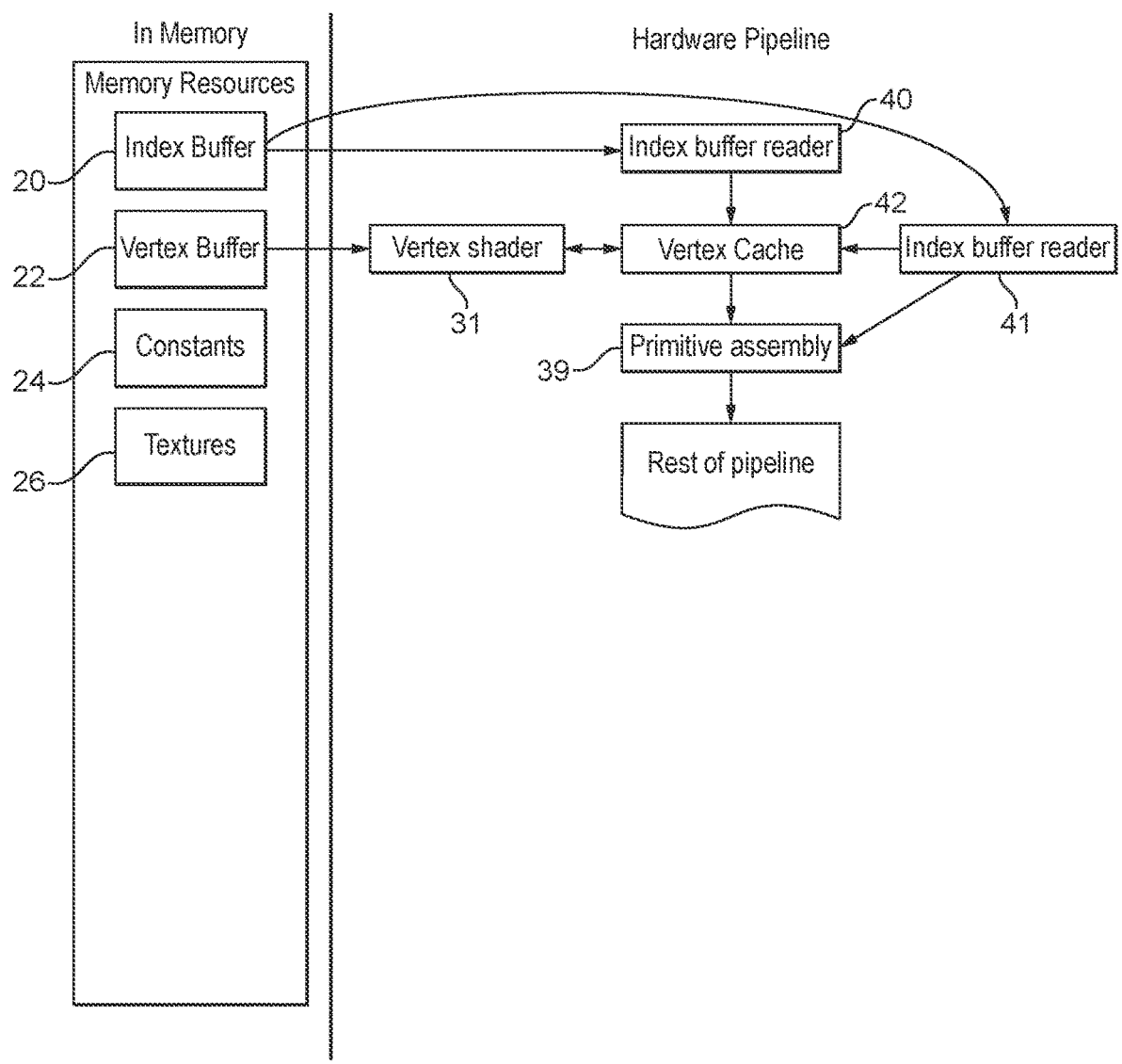
FIG. 3 shows schematically a graphics processing pipeline in accordance with various embodiments.

FIG. 3 shows some of the elements of the graphics processing pipeline 10 in detail.

As shown in FIG. 3, an index buffer reader 40 reads blocks of index buffer data from the index buffer 20 in external memory 5. It is then determined whether or not shaded vertex data for each read index is present in the vertex cache 42 (where this is not the case for a particular index, vertex shading is requested for the vertex indicated by that index; but where this is the case, the vertex data for the index can be provided from the cache 42 to the rest of the graphics processing pipeline 10).

The vertex shader 31 also reads vertex buffer data from the vertex buffer 22 for its vertex shading operations. The results of the vertex shading operations are stored in the vertex cache 42, and provided therefrom to the rest of the graphics processing pipeline 10.

As also shown in FIG. 3, a primitive assembly stage 39 (which may form part of the rasteriser 36) receives the results of the vertex shading operations from the vertex cache 42 for its primitive assembly operations. The primitive assembly stage 39 also receives index buffer data from a second index buffer reader 41 for its primitive assembly operations. The results of the primitive assembly operations (i.e. assembled primitives) are provided to the rest of the graphics processing pipeline 10.

Figure 4:
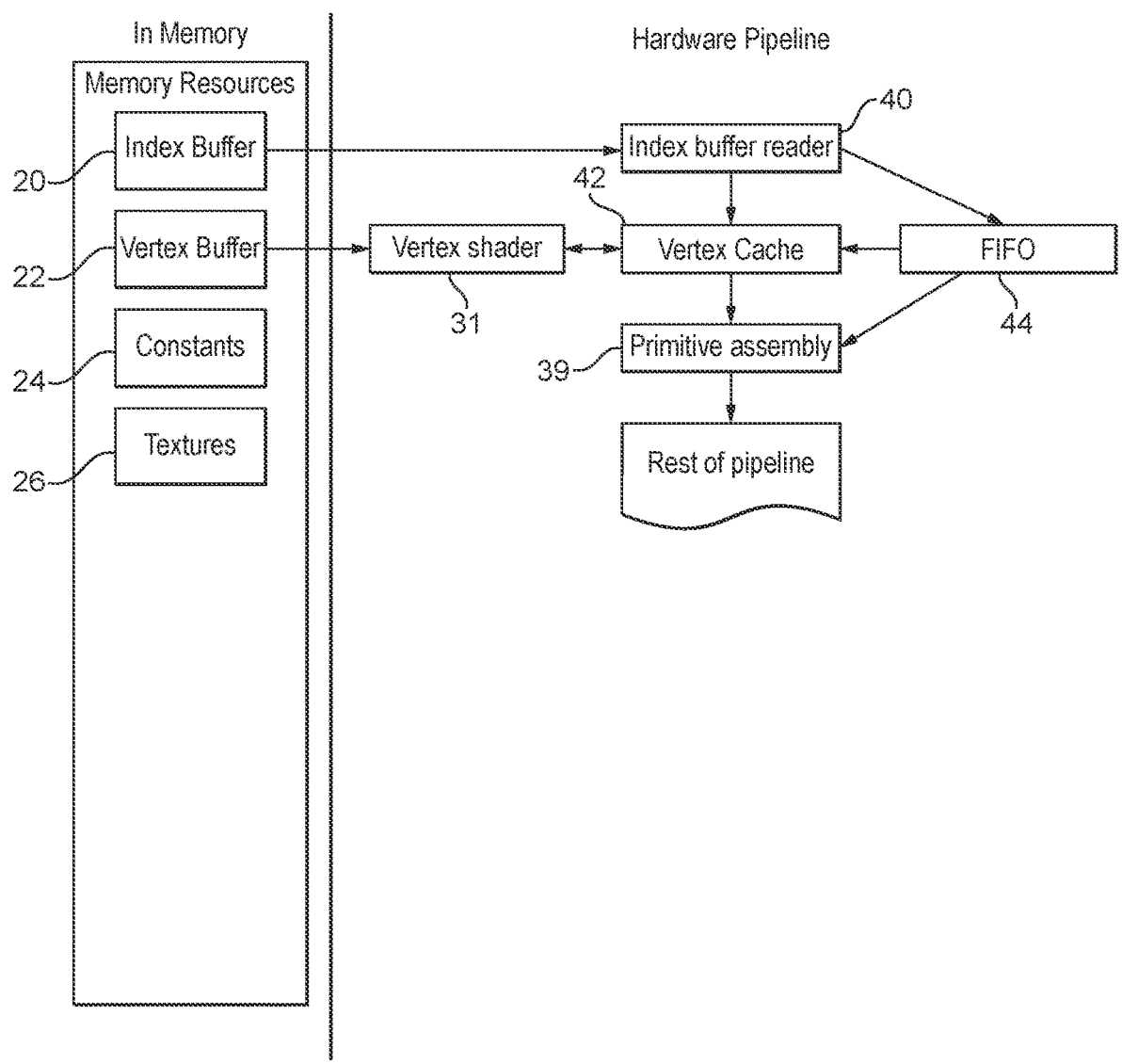
FIG. 4 shows schematically a graphics processing pipeline in accordance with various embodiments.

FIG. 4 shows an alternative arrangement for the graphics processing pipeline 10, where the index buffer data is read only once by an index buffer reader 40. In this case, the index buffer data is used to trigger vertex shading (as described above), but is also stored in a FIFO buffer 44. The primitive assembly stage 39 can then receive the stored index buffer data from the FIFO buffer 44 for its primitive assembly operations.

Figure 5:
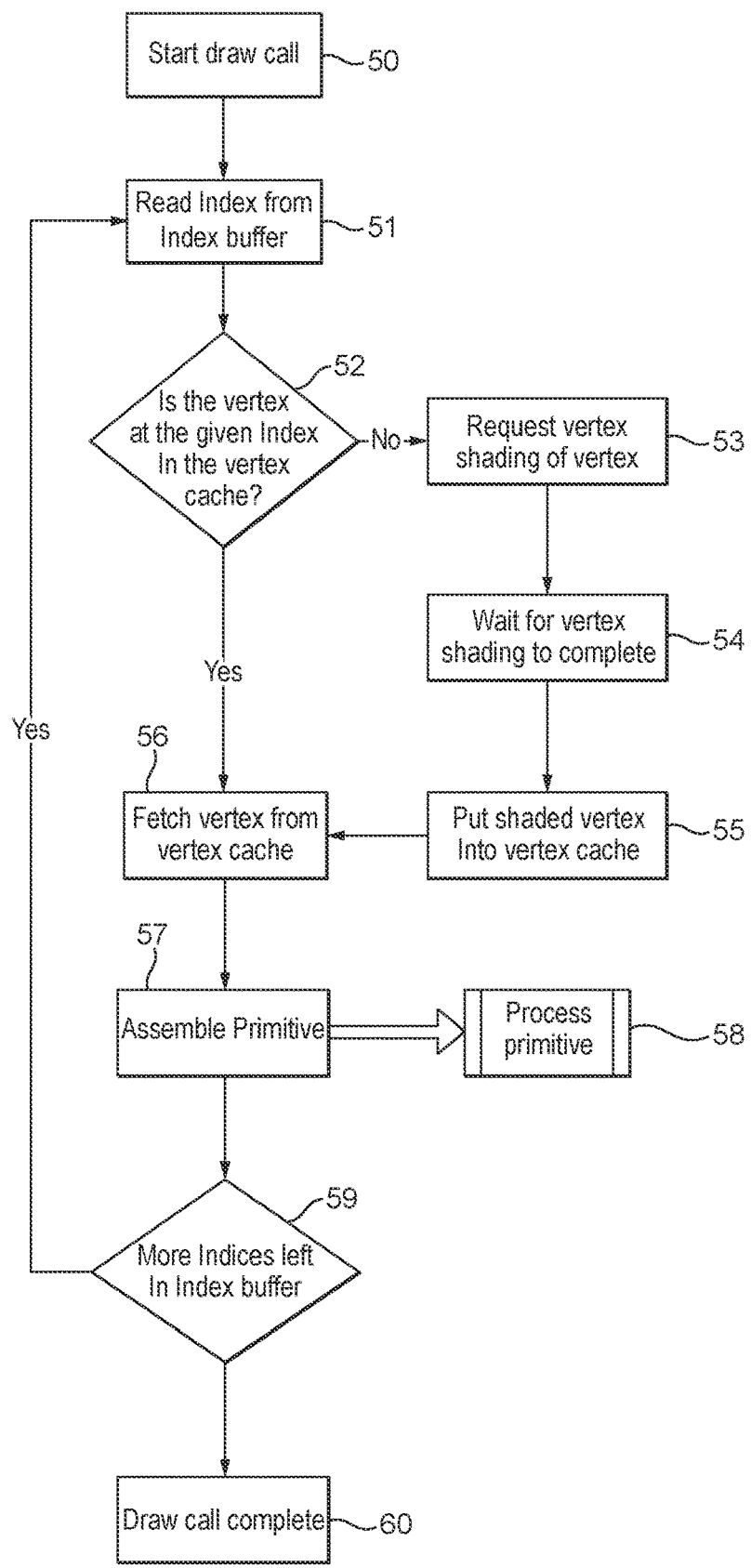
FIG. 5 is a flow chart of a graphics processing operation in accordance with various embodiments.

FIG. 5 is a flow chart describing the vertex shading operations and the primitive assembly operations. As shown in FIG. 5, at the start 50 of each draw call, index buffer data is read 51 from the index buffer 20.

It is then determined 52 whether or not shaded vertex data for a given index is present in the vertex cache 42. Where this is not the case, vertex shading is requested 53, and when the vertex shading has completed 54, the shaded vertex data is stored 55 in the vertex cache 42.

Next, the shaded vertex data in the vertex cache 42 is fetched and used together with the index data to assemble a primitive 57, and the assembled primitive is processed 58 by the rest of the graphics processing pipeline 10 (in the manner described above). Depending on the selected primitive type, data in respect of multiple vertices may be required before a primitive can be assembled 57 and processed 58.

Where more indices remain in the index buffer 59, this process is repeated by returning to step 51 and reading further index buffer data. This process continues until all the processing has been completed 60 for the draw call in question.

As described above, it is often necessary for a graphics processor to read a large amount of index buffer data during the vertex shading operations and primitive assembly operations.

Access to the index buffer 20 is usually pure streaming, whereby each buffer is usually read once from start to end, then never read again. The GPU's 4 access rate is quite limited. Normally, the GPU 4 uses one index value per clock cycle, but it could use more, e.g. 2, 4, 6, or 12 index values per clock cycle.

Figure 6:
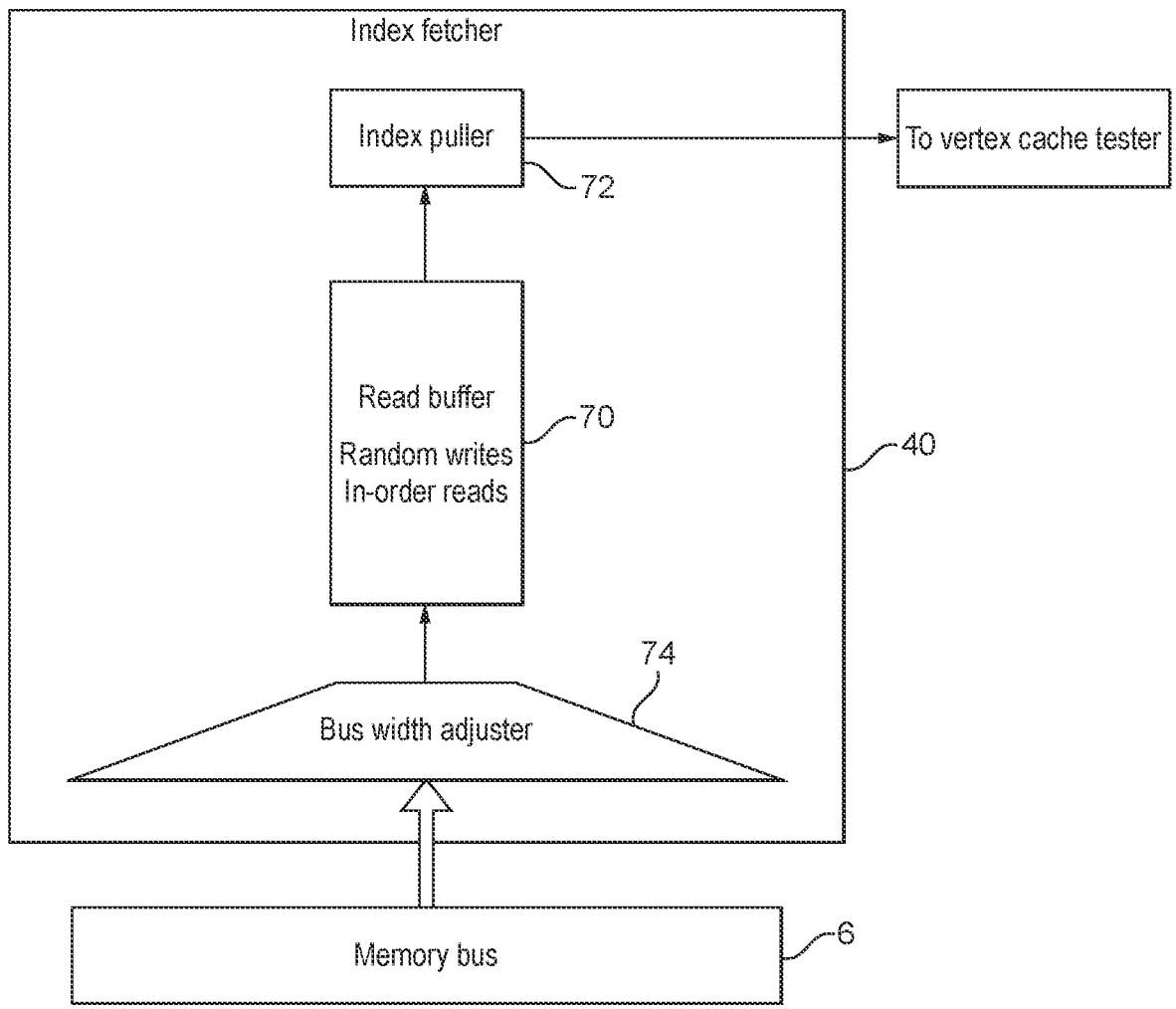
FIG. 6 shows schematically a read system of a graphic processor in accordance with various embodiments.

As illustrated by FIG. 6, the GPU 4 of the present embodiment therefore implements a streaming read buffer 70 based around a relatively narrow RAM 70.

FIG. 6 shows an index buffer reader 40 of the graphics processor 4 in detail. As shown in FIG. 6, the index buffer reader 40 receives blocks of index buffer data from the external memory 4 via a memory bus 6. The index buffer reader 40 includes a read buffer 70 in the form of a RAM for storing the received index buffer data. An index puller 72 can provide individual indices from the read buffer 70 to the rest of the graphics processing pipeline 10.

As illustrated in FIG. 6, it can often be the case that blocks of index buffer data (cache lines) received by the index buffer reader 40 of the graphics processor 4 from the external memory 4 (via the memory bus 6) are wider than the width of the index buffer reader's 40 read buffer 70 (i.e. comprise more data than the maximum amount of data that the index buffer reader's 40 read buffer 70 is capable of storing in a single clock cycle). For example, in the present embodiment, the read buffer 70 may be in the form of a 64 entry 128-bit wide (64*128-bit) RAM, and the memory bus 6 may be a 512-bit bus.

The index buffer reader 40 may therefore be provided with a bus width adjuster 74. The width mismatch can mean that multiple clock cycles are required to store a single block (cache line) of index buffer data in the read buffer 70. For example, 4 clock cycles are needed to write 512 bits of bus data into the 128-bit wide RAM 70. Stall cycles may therefore be used on the bus three out of four cycles.

This means that the memory bus 6 can be occupied for multiple clock cycles by the graphics processor 4 reading a single block (cache line) of index buffer data. This can in turn reduce the memory bus bandwidth that is available for use by other graphics processor operations and/or by other parts of the overall graphics processing system, and can accordingly slow the graphics processing system.

While it would be possible to provide the graphics processor 4 with a read buffer 70 that has sufficient width to store an entire block (cache line) of index buffer data in each clock cycle, such a read buffer 70 would require a relatively large amount of semiconductor area in the graphics processor 4, and so would increase the overall cost and power requirements of the graphics processor 4. It is often desirable to reduce the cost and power requirements of graphics processors, especially e.g. in portable devices, where power may be limited.

In this regard, as described above, the Applicant has recognised that the index buffer data is typically stored in the index buffer 20 in an uncompressed form (and is provided to the graphics processor 4 via the memory bus 6 in that form), but that the index buffer data tend to be very correlated, and therefore highly compressible.

While it would be possible to configure the graphics processing system to store index buffer data in the index buffer 20 in a compressed form (and to provide the index buffer data to the graphics processor 4 via the memory bus 6 in that form), this would require significant, potentially undesirable, changes to the overall graphics processing system, including for example to the application programming interface (API) of the graphics processing system.

In accordance with the present embodiment, the graphics processor 4 is configured to compress blocks of index buffer data, and to store compressed blocks of index buffer data in the read buffer 70. This is done in such a way that each compressed block of index buffer data can be stored in the read buffer 70 in a single clock cycle, or in a reduced number of clock cycles compared to the number of clock cycles required for an uncompressed block of index buffer data.

This means that the graphics processor 4 of the present embodiment (on average) requires fewer clock cycles to store a block (cache line) of index buffer data in the read buffer 70. This in turn beneficially reduces the number of clock cycles during which the memory bus 6 is occupied, and so can free up the bus 6 for other uses. This in effect increases the usable bandwidth on the bus 6.

Furthermore, configuring the graphics processor 4 itself to compress blocks of index buffer data obviates any need for significant changes to other parts of the overall graphics processing system, and can allow particularly efficient compression schemes to be used. The overall effect of this is that the graphics processor 4 can read index buffer data at a relatively fast rate, and in a manner that is particularly efficient in terms of cost, memory bandwidth and power usage.

For common applications, it has been found that the index buffer data can be compressed (using a "hard" compression scheme such as entropy encoding (e.g. arithmetic encoding, Huffman encoding, and the like)) down to around 1 or 2 bits per index (e.g. from uncompressed index buffer data comprising 16 or 32 bits per index). Thus, the graphics processor may be configured to compress blocks of index buffer data using entropy encoding such as arithmetic encoding, Huffman encoding, and the like, to form compressed versions of the blocks of data.

However, although such "hard" compression schemes can achieve a high compression rate, other compression schemes may be better suited in this context of a graphics processor compressing index buffer data.

This is because "hard" compression schemes such as entropy encoding are generally serial in nature. This means that an index may only be encoded when another related, e.g. immediately preceding, index has been encoded (and that an index may only be decoded when another related, e.g. immediately preceding, index has been decoded). However, it may be desirable for the graphics processor to be able to encode and/or decode multiple indices in parallel. Equally, "hard" compression schemes such as entropy encoding may require a significant amount of resources to implement in the graphics processor, e.g. in terms of semiconductor area, cost and/or power usage.

Thus, the compression scheme may comprise a compression scheme that allows multiple indices to be encoded and/or decoded in parallel (i.e. a parallel compression scheme). Equally, the compression scheme may comprise a relatively straightforward compression scheme that does not require a large amount of resources to implement.

For example, the (each) block may be compressed using a difference (delta) encoding scheme. In these embodiments, only one of the index representations (such as for example the first index representation of the block) may be encoded in its full form, while the other index representations may be encoded using a difference (delta) value relative to the first index representation.

However, other compression schemes may be better suited in this context of a graphics processor compressing index buffer data.

In the present embodiment, each (e.g. 512-bit) block of index buffer data is de-interleaved into two (e.g. 256-bit) initial sub-blocks in such a way that each resulting initial sub-block includes a contiguous sub-set of bits from each of the 32-bit index representations in the original block. For example, a first initial sub-block may be formed from the 16 higher most bits of each 32-bit index representation in the block, and a second initial sub-block may be formed from the 16 lower most bits of each 32-bit index representation in the block.

For each so-formed initial sub-block, it may be determined whether that initial sub-block comprises only zeroes.

At least for initial sub-blocks that do not comprise only zeroes, the initial sub-block may be further interleaved into two sub-blocks. This may be done in such a way that each sub-block includes a sub-set of bits from each of the index representations in the initial sub-block. For example, a first sub-block may be formed from the 11 higher most bits of each index representation, and a second sub-block may be formed from the 5 lower most bits of each index representation. The Applicant has found that the differences between the indices in each sub-block are often apparent only (or predominantly) in the 5 lower bits.

Thus, for each of the 256-bit blocks, each of the sixteen 16-bit indices is split into an 11-bit high part, forming an array (H0,H1,H2,H3, . . . , H15) and a 5-bit low part, forming an array (L0,L1,L2, . . . L15).

Next, it may be determined for the first sub-block, whether the values within the first sub-block differ by only a small amount, e.g. by −1, 0 or +1. The high-parts H1 . . . H7 are compared to H0 to check whether the difference is −1, 0, 1 or neither. Similarly, the high-parts of H9 . . . H15 are compared to H8 to check whether the difference is −1, 0, 1 or neither.

Where it is determined that the values within the first sub-block differ by only a small amount, e.g. by −1, 0 or +1, then that sub-block may be determined to be compressible. In other words, if all the high-part differences are −1, 0 or 1, then the block is deemed compressible.

Where a sub-block is determined to be compressible, the sub-block may be compressed, e.g. using a difference (delta) encoding scheme. Only one of the values (a first value) may be encoded in its full form, while the other values may be encoded using a difference (delta) value relative to the first value.

Such a block can be stored in a layout where L0 . . . L15, H1 and H8 are stored directly and H1 . . . H7 and H9 . . . H15 are stored in a representation where the difference values are encoded as an ASTC-style trit-block (14 trits in 23 bits). ASTC (Adaptive Scalable Texture Compression) a texture compression scheme.

The second sub-block may be stored in an uncompressed form.

It will be appreciated that according to the compression scheme of various embodiments, each sub-block may be determined (i) to include all zeroes; (ii) to be compressible; or (iii) to be uncompressible.

This leads to a number of possible layouts for storing each block of index buffer data.

In a first layout, one initial sub-block is compressible, while the other initial sub-block comprises all zeroes. In this case, the block of data may be stored as a single compressed sub-block, i.e. as one 128-bit item. The total compression ratio achieved is 4:1.

In a second layout, both the first sub-block and the second sub-block are compressible. In this case, the block of data may be stored as two compressed sub-blocks. This results in two 128-bit items being stored, and a compression ratio of 2:1.

In a third layout, one sub-block is incompressible, while the other sub-block comprises all zeroes. In this case, the block of data may be stored as an uncompressed sub-block. The block is stored as two 128-bit items, resulting in a compression ratio of 2:1.

In a fourth layout, none of the first to third layout are attainable, and the block of data may be stored in an uncompressed form. This requires four 128-bit items to be stored.

Testing on real-world data with this simple compression algorithm indicates that, for 32-bit indexes, the first layout is applicable to about 97% of input content. This is sufficient to avoid stalls 97% of the time even if the RAM 70 used to accept data is just 128 bits wide and is fed data from a fully saturated 512-bit bus.

If the indexes are provided as 16-bit representation, the second layout is used most of the time, resulting in a 2:1 compression most of the time.

This algorithm can be improved by reserving an encoding for the special-value used for primitive-restarts. A primitive restart is commonly indicated in the index buffer data using an all-ones representation. This would lead to large differences (deltas) and poor compression. Such large differences (deltas) can be avoided (and the compression improved) by using a special value to indicate a primitive restart. This could be done by e.g. interpreting a high trit value of +1 and a low-bits value of 11111 as the restart-value.

Although this compressions scheme requires additional logic for compressing and decompressing, as well as storing some metadata about the compression used in each cache line, the overhead of this scheme is significantly less than the overhead of implementing a wide RAM.

Figure 7:
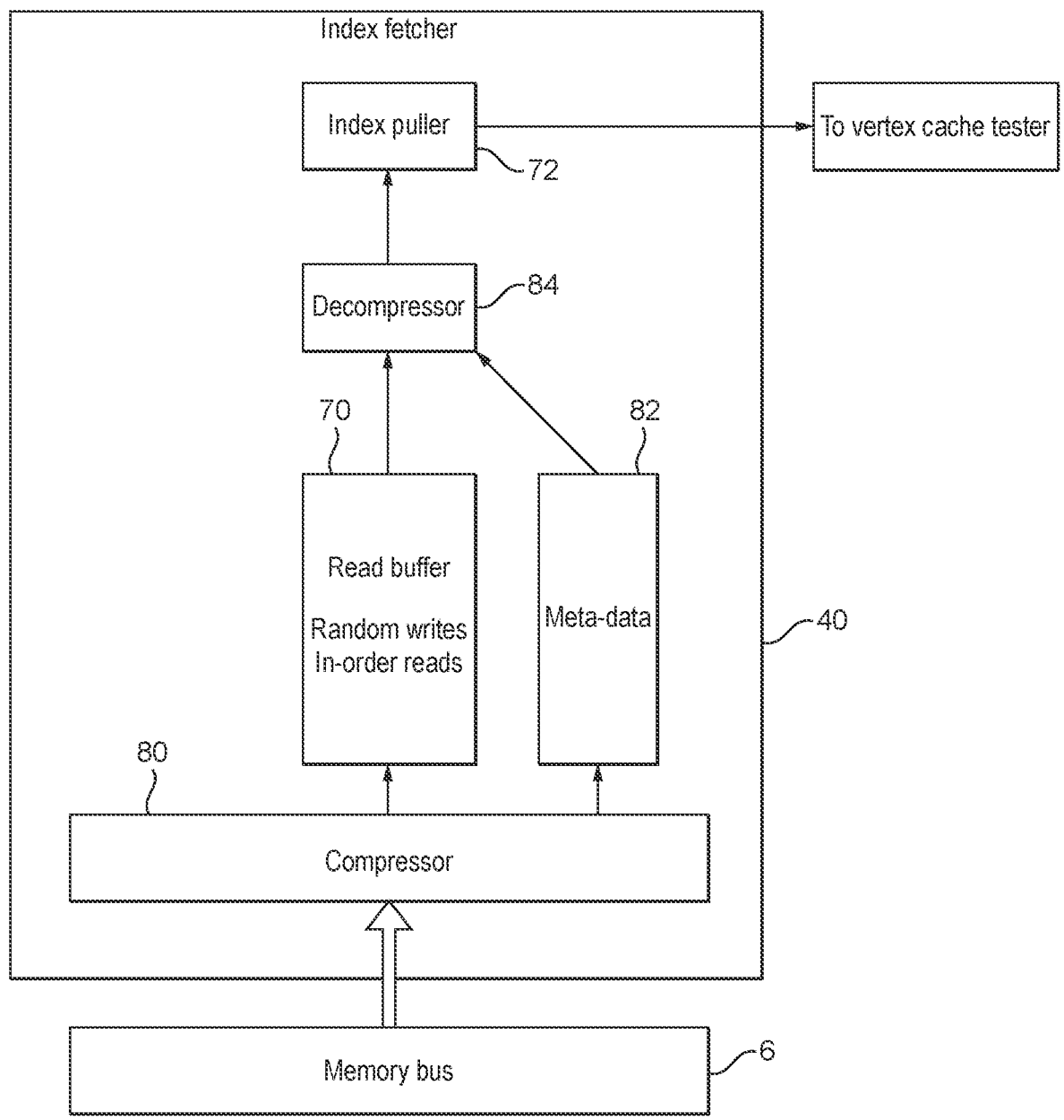
FIG. 7 shows schematically a read system of a graphic processor in accordance with various embodiments.

FIG. 7 shows the index reader 40 configured in accordance with these embodiments. As shown in FIG. 7, blocks of index buffer data received from the external memory 4 via the memory bus 6 are compressed by a compressor 80. Compressed blocks of index buffer data are then stored in the read buffer 70. Meta-data indicating the layout used for each compressed block of index buffer data is also stored in a meta-data buffer 82. A decompressor 84 uses both the compressed blocks of index buffer data from the read buffer 70 and the meta-data from the meta-data buffer 8 to decompress each compressed blocks of index buffer data. The index puller 72 can then provide individual indices to the rest of the graphics processing pipeline 10.

Figure 8:
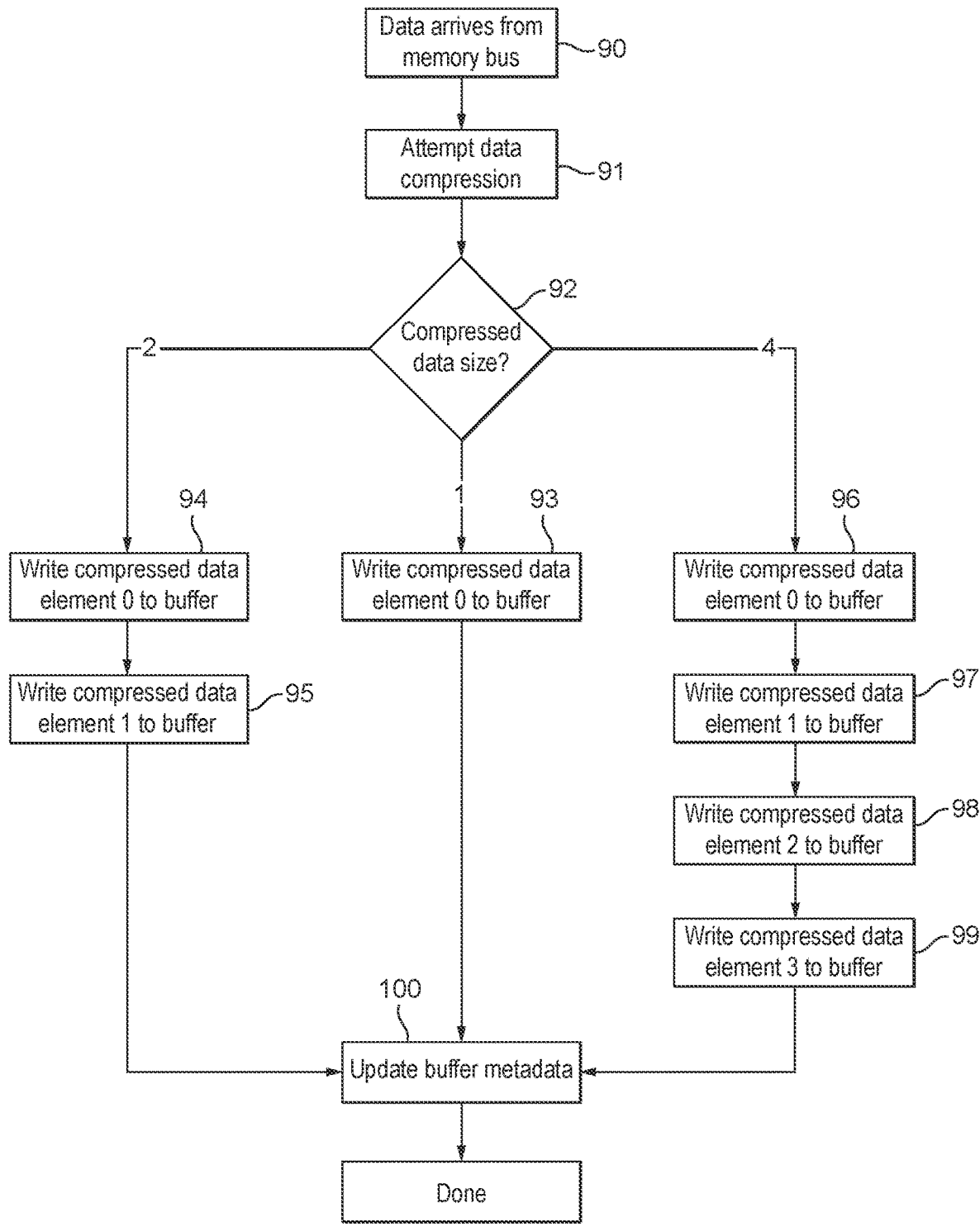
FIG. 8 is a flow chart of a graphics processing operation in accordance with various embodiments.

FIG. 8 is a flow chart illustrating the compression scheme of various embodiments.

As shown in FIG. 8, when a block of index buffer data arrives 90 from the memory bus 6, it is compressed (or not) 81 (as described above). Then the size of the compressed block of data is determined 92.

Where the block of index buffer data has been compressed to a single (e.g. 128-bit) item, that item is written 93 to the buffer 70. Where the block of index buffer data has been compressed to two (e.g. 128-bit) items, each of the two items are written 94, 95 to the buffer 70. Where the block of index buffer data has not been compressed, each of four (e.g. 128-bit) items are written 96, 97, 99 to the buffer 70. Once the data has been written to the buffer 70, the metadata is updated 100 in the metadata buffer 82

Figure 9:
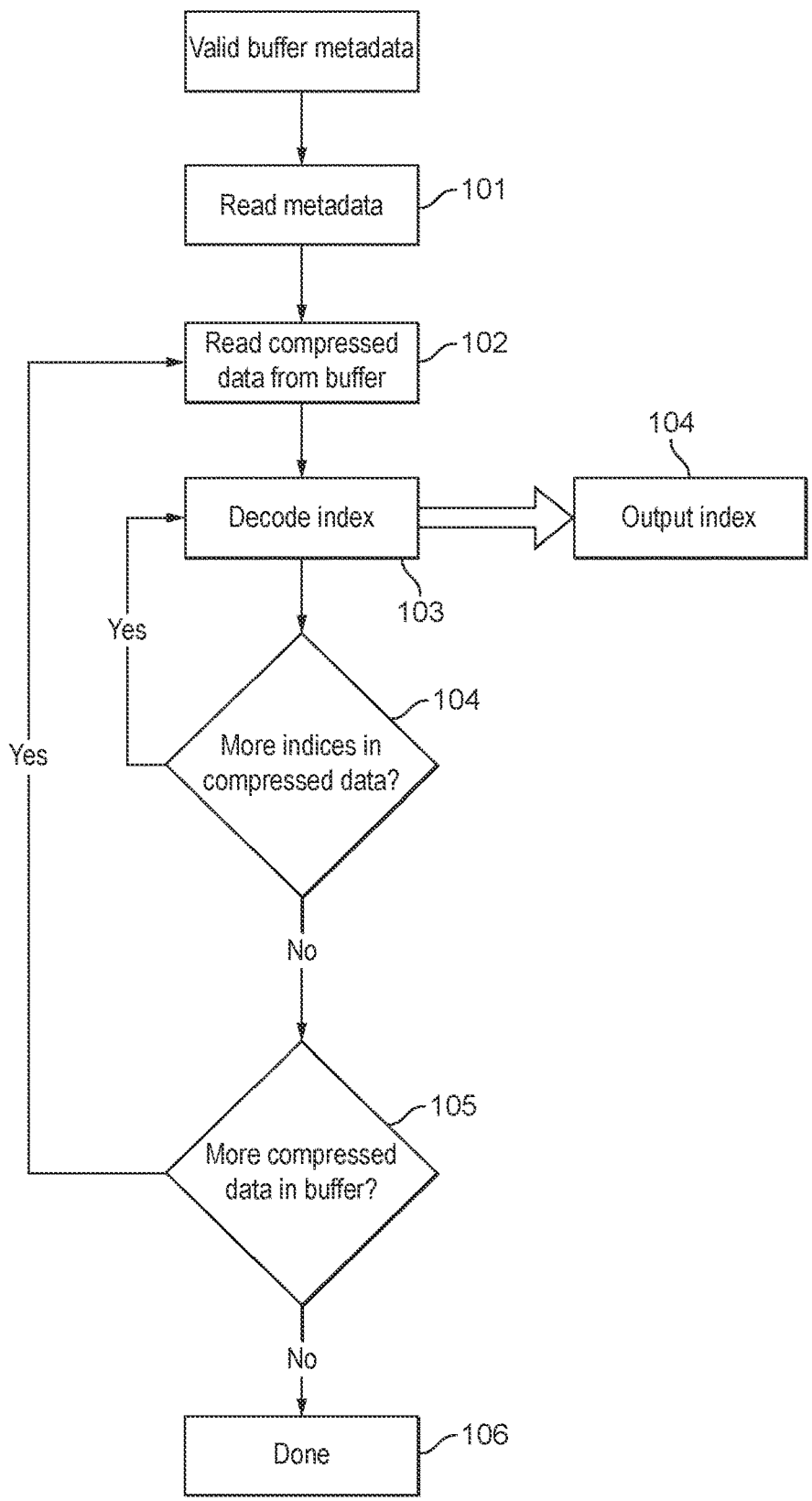
FIG. 9 is a flow chart of a graphics processing operation in accordance with various embodiments.

FIG. 9 is a flow chart illustrating the decompression according to various embodiments. As shown in FIG. 9, the metadata is read 101 from the metadata buffer 82, and the compressed index buffer data is read 102 from the read buffer 70. The index buffer data is then decoded 103, and output 104. This is process is repeated 104 for each index. This process is also repeated 105 where more compressed index data is present in the read buffer 70, until all of the index data has been decompressed 106.

Further embodiments relate to compressing indices for later use. In the rendering flow of the GPU 4, the index buffer data must be read to figure out which vertices are required, a vertex shader is run on these vertices, and finally primitives are built using the results of the shaders.

Running shaders can take thousands of cycles and requires the index buffer to either be read twice, or for the index values to be stored until the shading results are complete. Testing indicates that approximately 3000 cycles worth of indices must be stored to hide the latency of the shading.

This storage would be a 3000*32-bit RANI if implemented naïvely, but would increase to 3000*384-bit for a 12-indices-per-cycle GPU.

Since this storage is well disconnected from the system bus 6, and the peak data rate is low and fully known, more advanced compression algorithms can be used than those described above.

For example, one simple algorithm would be to calculate the delta between successive indices, and create a simple variable length encoding scheme, e.g. only supporting 4, 8, 16, and 32-bit encoding lengths.

Testing shows that the average encoding length using real-world content would be well below 8 bits. This translates to a three times or better compression ratio. Using a Huffman-style encoding or arithmetic encoding would create even better compression ratios.

The compression ratio can be used to reduce the total number of bits in the RAM and can also be used to achieve acceptable index rates with a narrower (and taller) RAM.

Figure 10:
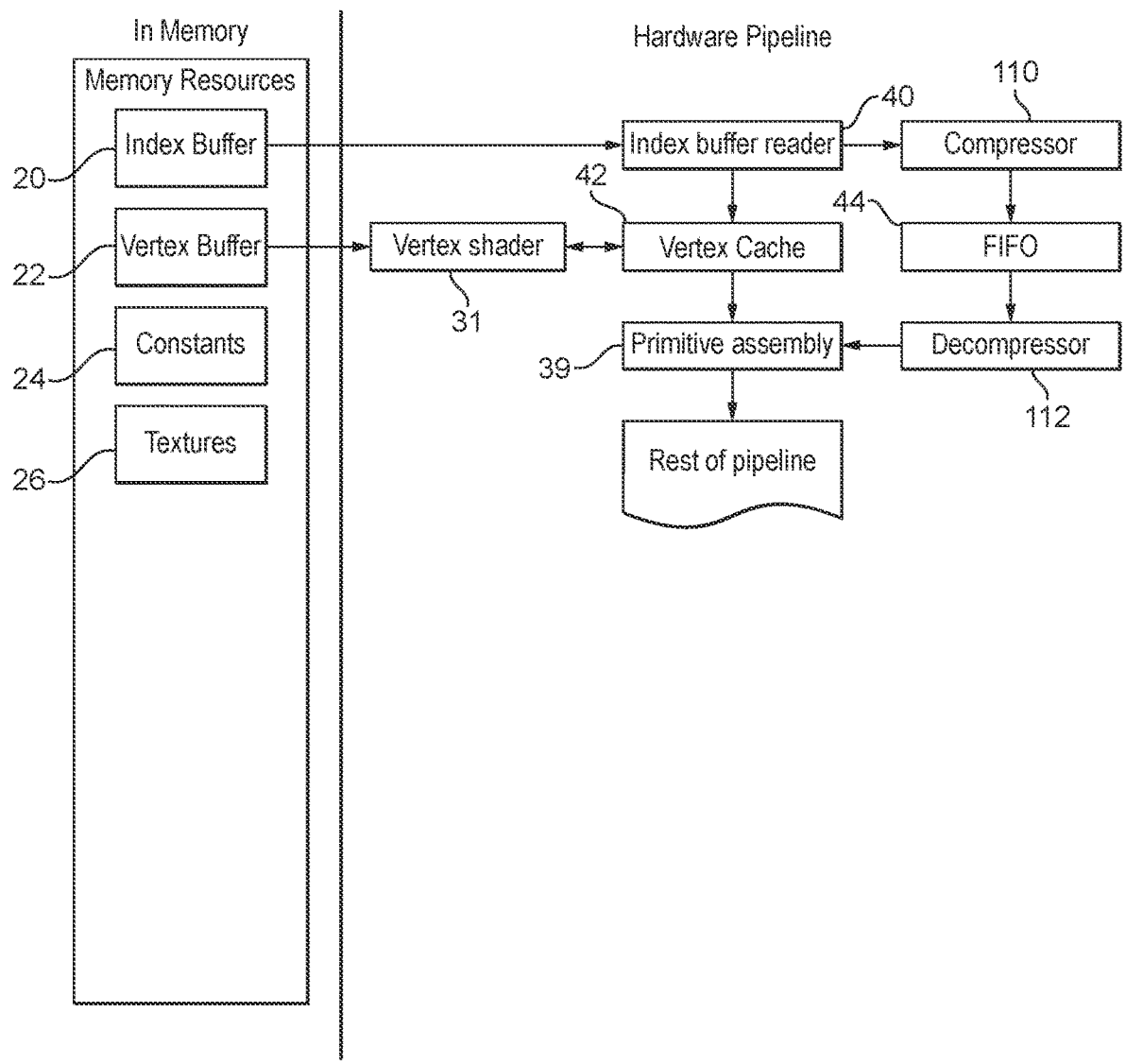
FIG. 10 shows schematically a graphics processing pipeline in accordance with various embodiments.

FIG. 10 shows elements of a graphics processing pipeline 10 that is configured in the manner of these embodiments. As shown in FIG. 10, the graphics processing pipeline 10 is configured in a similar manner to the graphics processing pipeline 10 of FIG. 4, except that a compressor 110 compresses index buffer data before it is stored in the FIFO 44, and a decompressor 112 decompresses the index buffer data before it is provided to the primitive assembly stage 39.

It will be appreciated that various embodiments provide improved techniques for a graphics processor reading index buffer data. This is achieved, in embodiments at least, by the graphics processor compressing index buffer data.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical applications, to thereby enable others skilled in the art to best utilise the technology, in various embodiments and with various modifications as are suited to the particular use contemplated. It is intended that the scope be defined by the claims appended hereto.

What is claimed is:

1. A method of operating a graphics processor that is configured to execute a graphics processing pipeline, the method comprising:

the graphics processor reading, from an index buffer in external memory, a block of index buffer data comprising plural sets of indices, each set of indices comprising a sequence of indices indexing a set of vertices that defines a primitive of a plurality of primitives to be processed by the graphics processing pipeline;

the graphics processor compressing the block of index buffer data to form a compressed version of the block of index buffer data; and the graphics processor storing the compressed version of the block of index buffer data in an internal memory of the graphics processor;

wherein compressing the block of index buffer data comprises:

dividing the block of index buffer data into two or more sub-blocks;

compressing one or more of the sub-blocks, without compressing one or more other of the sub-blocks;

wherein the method further comprises determining whether one or more of the sub-blocks should be compressed based on a degree of variation of values in the one or more of the sub-blocks.

2. The method of claim 1, where a width of the internal memory is less than a size of the block of index buffer data.

3. The method of claim 1, wherein dividing the block of index buffer data into two or more sub-blocks comprises:

dividing the block of index buffer data into at least a first sub-block formed from the higher most bits of each representation of each index in the block of index buffer data, and a second sub-block formed the lower most bits of each representation of each index in the block of index buffer data.

4. The method of claim 1, wherein dividing the block of index buffer data into two or more sub-blocks comprises:

dividing the block of index buffer data into a first initial sub-block formed from the higher most bits of each representation of each index in the block of index buffer data, and a second initial sub-block formed from the lower most bits of each representation of each index in the block of index buffer data; and dividing the first initial sub-block into a first sub-block formed from the higher most bits of each representation in the first initial sub-block, and a second sub-block formed from the lower most bits of each representation in the first initial sub-block; and/or dividing the second initial sub-block into a third sub-block formed from the higher most bits of each representation in the second initial sub-block, and a fourth sub-block formed from the lower most bits of each representation in the second initial sub-block.

5. The method of claim 4, wherein compressing one or more of the sub-blocks comprises compressing the first and/or third sub-blocks, without compressing the second and/or fourth sub-blocks.

6. The method of claim 1, wherein compressing the one or more of the sub-blocks comprises:

determining a set of difference values by comparing each value of plural values within the one or more sub-blocks to a particular value within the one or more sub-blocks so as to determine a difference between that value and the particular value; and using the set of difference values to form the compressed version of the block of index buffer data.

7. The method of claim 1, wherein compressing the block of index buffer data comprises:

determining whether the bits of the one or more of the sub-blocks are all zero; and discarding the one or more of the sub-blocks when it is determined that the bits of the one or more of the sub-blocks are all zero.

8. The method of claim 1, wherein:

compressing the block of index buffer data comprises the graphics processor selecting one layout of a plurality of possible layouts for storing the compressed version of the block of index buffer data; and storing the compressed version of the block of index buffer data comprises the graphics processor storing the compressed version of the block of index buffer data in the internal memory using the selected layout.

9. The method of claim 8, further comprising the graphics processor generating and storing metadata indicative of the selected layout.

10. The method of claim 1, further comprising the graphics processor:
   decompressing the compressed version of the block of index buffer data; and
   using the decompressed block of index buffer data for vertex shading and/or primitive assembly.

11. The method of claim 1, further comprising the graphics processor:
   using the block of index buffer data read from the external memory for vertex shading;
   decompressing the compressed version of the block of index buffer data; and then
   using the decompressed block of index buffer data for primitive assembly.

12. A graphics processor configured to execute a graphics processing pipeline, the graphics processor comprising:
   a read circuit configured to read, from an index buffer in external memory, a block of index buffer data comprising plural sets of indices, each set of indices comprising a sequence of indices indexing a set of vertices that defines a primitive of a plurality of primitives to be rendered by the graphics processing pipeline;
   an internal memory; and
   a compressor circuit configured to compress the block of index buffer data to form a compressed version of the block of index buffer data, and to store the compressed version of the block of index buffer data in the internal memory;
   wherein the compressor circuit is configured to:
   divide the block of index buffer data into two or more sub-blocks; and
   compress one or more of the sub-blocks, without compressing one or more other of the sub-blocks;
   wherein the graphics processor is configured to determine whether one or more of the sub-blocks should be compressed based on a degree of variation of values in the one or more of the sub-blocks.

13. The graphics processor of claim 12, wherein the compressor circuit is configured to:
   divide the block of index buffer data into a first initial sub-block formed from the higher most bits of each representation of each index in the block of index buffer data, and a second initial sub-block formed from the lower most bits of each representation of each index in the block of index buffer data;
   divide the first initial sub-block into a first sub-block formed from the higher most bits of each representation in the first initial sub-block, and a second sub-block formed from the lower most bits of each representation in the first initial sub-block, and/or divide the second initial sub-block into a third sub-block formed from the higher most bits of each representation in the second initial sub-block, and a fourth sub-block formed from the lower most bits of each representation in the second initial sub-block; and
   compress the first and/or third sub-blocks, without compressing the second and/or fourth sub-blocks.

14. The graphics processor of claim 12, wherein the graphics processor is configured to:
   use the block of index buffer data read from the external memory for vertex shading;
   decompress the compressed version of the block of index buffer data; and then
   use the decompressed block of index buffer data for primitive assembly.

15. A non-transitory computer readable storage medium storing computer software code which when executing on a processor performs a method of operating a graphics processor, the method comprising:
   the graphics processor reading, from an index buffer in external memory, a block of index buffer data comprising plural sets of indices, each set of indices comprising a sequence of indices indexing a set of vertices that defines a primitive of a plurality of primitives to be processed by the graphics processing pipeline;
   the graphics processor compressing the block of index buffer data to form a compressed version of the block of index buffer data; and
   the graphics processor storing the compressed version of the block of index buffer data in an internal memory of the graphics processor;
   wherein compressing the block of index buffer data comprises:
   dividing the block of index buffer data into two or more sub-blocks; and
   compressing one or more of the sub-blocks, without compressing one or more other of the sub-blocks;
   wherein the method further comprises determining whether one or more of the sub-blocks should be compressed based on a degree of variation of values in the one or more of the sub-blocks.

16. A method of operating a graphics processor that is configured to execute a graphics processing pipeline, the method comprising:
   the graphics processor reading, from an index buffer in external memory, a block of index buffer data comprising plural sets of indices, each set of indices comprising a sequence of indices indexing a set of vertices that defines a primitive of a plurality of primitives to be processed by the graphics processing pipeline;
   the graphics processor compressing the block of index buffer data to form a compressed version of the block of index buffer data; and
   the graphics processor storing the compressed version of the block of index buffer data in an internal memory of the graphics processor;
   wherein compressing the block of index buffer data comprises:
   dividing the block of index buffer data into two or more sub-blocks; and
   compressing one or more of the sub-blocks, without compressing one or more other of the sub-blocks;
   wherein dividing the block of index buffer data into two or more sub-blocks comprises:
   dividing the block of index buffer data into at least a first sub-block formed from the higher most bits of each representation of each index in the block of index buffer data, and a second sub-block formed the lower most bits of each representation of each index in the block of index buffer data.

17. A method of operating a graphics processor that is configured to execute a graphics processing pipeline, the method comprising:
   the graphics processor reading, from an index buffer in external memory, a block of index buffer data comprising plural sets of indices, each set of indices comprising a sequence of indices indexing a set of vertices that defines a primitive of a plurality of primitives to be processed by the graphics processing pipeline;

the graphics processor compressing the block of index buffer data to form a compressed version of the block of index buffer data; and the graphics processor storing the compressed version of the block of index buffer data in an internal memory of the graphics processor;

wherein compressing the block of index buffer data comprises:

dividing the block of index buffer data into two or more sub-blocks; and compressing one or more of the sub-blocks, without compressing one or more other of the sub-blocks;

wherein the compressing one or more of the sub-blocks comprises:

determining a set of difference values by comparing each value of plural values within the one or more of the sub-blocks to a particular value within the one or more of the sub-blocks so as to determine a difference between that value and the particular value; and using the set of difference values to form the compressed version of the block of index buffer data.

18. A method of operating a graphics processor that is configured to execute a graphics processing pipeline, the method comprising:

the graphics processor reading, from an index buffer in external memory, a block of index buffer data comprising plural sets of indices, each set of indices comprising a sequence of indices indexing a set of vertices that defines a primitive of a plurality of primitives to be processed by the graphics processing pipeline;

the graphics processor compressing the block of index buffer data to form a compressed version of the block of index buffer data; and the graphics processor storing the compressed version of the block of index buffer data in an internal memory of the graphics processor;

wherein compressing the block of index buffer data comprises:

dividing the block of index buffer data into two or more sub-blocks;

compressing one or more of the sub-blocks, without compressing one or more other of the sub-blocks;

determining whether the bits of the one or more of the sub-blocks are all zero; and discarding the one or more of the sub-blocks when it is determined that the bits of the one or more of the sub-blocks are all zero.

\* \* \* \* \*

UNITED STATES PATENT AND TRADEMARK OFFICE
CERTIFICATE OF CORRECTION

| | |
|---|---|
| PATENT NO. | : 11,189,005 B1 |
| APPLICATION NO. | : 17/004797 |
| DATED | : November 30, 2021 |
| INVENTOR(S) | : Engh-Halstvedt et al. |

It is certified that error appears in the above-identified patent and that said Letters Patent is hereby corrected as shown below:

In the Claims

Column 32, Line 22 (Claim 3): please replace "formed the" with -- formed from the --

Column 34, Line 59 (Claim 16): please replace "formed the" with -- formed from the --

Signed and Sealed this
Tenth Day of May, 2022

Katherine Kelly Vidal
*Director of the United States Patent and Trademark Office*